United States Patent
Kahtava et al.

(10) Patent No.: US 11,711,676 B2
(45) Date of Patent: Jul. 25, 2023

(54) TELECOMMUNICATIONS APPARATUSES AND METHODS

(71) Applicant: Sony Corporation, Tokyo (JP)

(72) Inventors: Jussi Tapani Kahtava, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 393 days.

(21) Appl. No.: 16/881,980

(22) Filed: May 22, 2020

(65) Prior Publication Data

US 2020/0288287 A1 Sep. 10, 2020

Related U.S. Application Data

(63) Continuation of application No. 15/768,604, filed as application No. PCT/EP2016/072504 on Sep. 22, 2016, now Pat. No. 10,667,097.

(30) Foreign Application Priority Data

Nov. 12, 2015 (EP) .................................... 15194392

(51) Int. Cl.
*H04W 4/70* (2018.01)
*H04W 4/80* (2018.01)
*H04W 4/40* (2018.01)
*H04W 48/20* (2009.01)
*H04W 52/02* (2009.01)
*H04W 76/14* (2018.01)
(Continued)

(52) U.S. Cl.
CPC ......... *H04W 4/40* (2018.02); *H04L 63/0876* (2013.01); *H04W 4/70* (2018.02); *H04W 4/80* (2018.02); *H04W 48/20* (2013.01); *H04W 52/0216* (2013.01); *H04W 52/0219* (2013.01); *H04W 60/04* (2013.01); *H04W 76/10* (2018.02); *H04W 76/14* (2018.02); *H04W 76/27* (2018.02); *H04W 4/90* (2018.02); *Y02D 30/70* (2020.08)

(58) Field of Classification Search
None
See application file for complete search history.

(56) References Cited

U.S. PATENT DOCUMENTS 9,065,694 B2 * 6/2015 Siti ..................... H04B 7/0456
9,135,612 B1 9/2015 Proctor, Jr.
(Continued)

FOREIGN PATENT DOCUMENTS

CN 102948233 A 2/2013
CN 104160745 A 11/2014
(Continued)

OTHER PUBLICATIONS

International Search Report dated Jan. 10, 2017, in PCT/EP2016/072504, filed Sep. 22, 2016.
(Continued)

*Primary Examiner* — Edan Orgad
*Assistant Examiner* — Emmanuel K Maglo
(74) *Attorney, Agent, or Firm* — Xsensus LLP

(57) ABSTRACT

Methods and apparatuses for activating a vehicular-capable terminal to connect to a base station and/or road side unit. Accordingly a vehicular-capable terminal which would otherwise be in idle mode can then participate in vehicular communications, if appropriate.

17 Claims, 7 Drawing Sheets

(51) Int. Cl.
   *H04W 60/04* (2009.01)
   *H04W 76/27* (2018.01)
   *H04W 76/10* (2018.01)
   *H04L 9/40* (2022.01)
   *H04W 4/90* (2018.01)

(56) References Cited

U.S. PATENT DOCUMENTS

| | | | | |
|---|---|---|---|---|
| 9,603,062 | B2* | 3/2017 | Horn | H04W 36/00835 |
| 10,037,508 | B1* | 7/2018 | Rusnak | H04W 4/80 |
| 2005/0288017 | A1* | 12/2005 | Doumenc | H04W 36/00835 |
| | | | | 455/435.3 |
| 2008/0049682 | A1* | 2/2008 | Ding | H04W 76/40 |
| | | | | 370/335 |
| 2009/0137228 | A1* | 5/2009 | Horn | H04W 48/02 |
| | | | | 455/411 |
| 2011/0090093 | A1 | 4/2011 | Grimm et al. | |
| 2012/0087303 | A1* | 4/2012 | Kwon | H04W 48/10 |
| | | | | 370/328 |
| 2012/0115471 | A1 | 5/2012 | Awoniyi et al. | |
| 2012/0195255 | A1 | 8/2012 | Nylander et al. | |
| 2012/0252451 | A1 | 10/2012 | Knauft | |
| 2013/0252613 | A1* | 9/2013 | Charbit | H04W 36/30 |
| | | | | 455/437 |
| 2014/0011502 | A1* | 1/2014 | Moilanen | H04W 36/245 |
| | | | | 455/437 |
| 2014/0189801 | A1* | 7/2014 | Rokusek | G06F 21/00 |
| | | | | 726/4 |
| 2014/0301371 | A1* | 10/2014 | Maeda | H04W 84/005 |
| | | | | 370/331 |
| 2014/0308897 | A1 | 10/2014 | Toya | |
| 2015/0002311 | A1 | 1/2015 | Spiess | |
| 2015/0035685 | A1 | 2/2015 | Strickland et al. | |
| 2015/0098416 | A1* | 4/2015 | Kuo | H04W 72/04 |
| | | | | 370/329 |
| 2015/0282210 | A1 | 10/2015 | Li et al. | |
| 2016/0001720 | A1* | 1/2016 | Vadgama | G06Q 30/0645 |
| | | | | 701/2 |
| 2016/0042342 | A1 | 2/2016 | Proctor, Jr. | |
| 2016/0142880 | A1* | 5/2016 | Talluri | H04W 52/282 |
| | | | | 455/456.1 |
| 2016/0338124 | A1* | 11/2016 | Byun | H04L 5/0053 |
| 2017/0019858 | A1* | 1/2017 | Zhao | H04W 52/0216 |
| 2017/0086054 | A1* | 3/2017 | Azevedo | H04W 4/70 |
| 2018/0081048 | A1* | 3/2018 | Saitou | G01S 13/46 |
| 2018/0139593 | A1* | 5/2018 | Chun | H04W 4/46 |
| 2018/0167796 | A1* | 6/2018 | Raje | H04W 4/023 |
| 2018/0242115 | A1* | 8/2018 | Kim | H04W 4/40 |
| 2019/0028862 | A1 | 1/2019 | Futaki | |
| 2020/0175873 | A1* | 6/2020 | Xu | G08G 1/005 |

FOREIGN PATENT DOCUMENTS

| | | | |
|---|---|---|---|
| DE | 102012211172 A1 | 4/2014 | |
| WO | WO2014121491 A1 | 8/2014 | |
| WO | WO 2015/067308 A1 | 5/2015 | |
| WO | WO-2015067308 A1 * | 5/2015 | H04W 60/04 |

OTHER PUBLICATIONS

Holma H. et al, "LTE for UMTS OFDMA and SC-FDMA based radio access", 2009, 8 pages.
"37rd Generation Partnership Project; Technical Specification Group Core Network and Terminals: Numbering, addressing and identification (Release 13)", GPP TS 23.003 V13.3.0, Sep. 2015, 94 pages.
K. Dalamagkidis et al., "2006 14th Mediterranean Conference on Control and Automation", A Mobile Landing Platform for Miniature Vertical Take-Off and Landing Vehicles, Mar. 12, 2007.
Wiroon Sriborrirux et al., "2015 IEEE 81st Vehicular Technology Conference (VTC Spring)", An Embedded RF-Based Motorcycle Trajectory Data for Security Monitoring System over University Vehicular Network, Jul. 2, 2015.
Liang Chu, "Chinese Master's Theses Full-text Database, Information Technology Edition", Study of load balance mechanism in LTE system, Jul. 15, 2011.
He Zhenzhen, "Chinese Master's Theses Full-text Database, Information Technology Edition", The Research on Handover Technology under High-Speed Mobile Communication System Based on LTE-R, May 15, 2014.

* cited by examiner

TELECOMMUNICATIONS APPARATUSES AND METHODS

CROSS REFERENCE TO RELATED APPLICATIONS

The present application is a continuation application of U.S. application Ser. No. 15/768,604 filed on Apr. 16, 2018, which is based on PCT filing PCT/EP2016/072504 filed on Sep. 22, 2016, which claims priority to EP 15194392.5 filed on Nov. 12, 2015, the entire contents of each are incorporated herein by reference

FIELD

The present disclosure relates to telecommunications apparatuses and methods.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunications systems, such as those based on the 3GPP defined UMTS and Long Term Evolution (LTE) and Long Term Evolution Advanced (LTE-A) architecture, are able to support more sophisticated services than simple voice and messaging services offered by previous generations of mobile telecommunications systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which there is a desire for a group of terminal devices (communications devices) to exchange information with each other in a fast and reliable manner. In order to help address these limitations there have been proposed approaches in which terminal devices within a wireless telecommunications system may be configured to communicate data directly with one another without some or all their communications passing through an infrastructure equipment element, such as a base station. Such communications are commonly referred to generally as a device-to-device (D2D) communications. Many device-to-device communications may be transmitted by one device to a plurality of other devices in a broadcast like manner and so in that sense the phrase "device-to-device communications" also covers "device-to-devices communications".

Thus, D2D communications allow communications devices that are in sufficiently close proximity to directly communicate with each other, both when within the coverage area of a network and when outside a network's coverage area (e.g. due to geographic restrictions on a network's extent or because the network has failed or is in effect unavailable to a terminal device because the network is overloaded). D2D communications can allow user data to be more efficiently and quickly communicated between communications devices by obviating the need for user data to be relayed by a network entity such as a base station. D2D communications also allow communications devices to communicate with one another even when one or both devices may not be within the reliable coverage area of a network. The ability for communications devices to operate both inside and outside of coverage areas makes wireless telecommunications systems that incorporate D2D capabilities well suited to applications such as public protection/safety and disaster relief (PPDR), for example. PPDR related communications may benefit from a high degree of robustness whereby devices can continue to communicate with one another in congested networks and when outside a coverage area. 3GPP has developed some proposals for such public safety D2D use in LTE networks in Release12.

The automotive industry has been working for several years on solutions to enable communication with and between vehicles, e.g. to help improve traffic flow and safety. These techniques can range from automatic tolling technologies to collision prevention mechanisms, and are generally known as Intelligent Transport Systems (ITS). Currently, the main radio technology under consideration in standards projects relating to ITS is a WLAN derivative 802.11p, which would be used for broadcasting ITS information by vehicles or road side infrastructure to other vehicles. This constitutes so-called Dedicated Short Range Communication (DSRC) system that is deployed at 5.9 GHz ITS band in Europe and North America (there may be different ITS bands in use in other regions, e.g. 700 MHz in Japan).

The effective range of DSRC systems is a few hundred meters and the services are broadcast oriented (emergency vehicle notices, for example).

However, there have also been proposals for communications based on those used in mobile telecommunications systems, such as Long Term Evolution (LTE) based networks operating on International Mobile Telecommunications (IMT) bands, to help support ITS applications, for example to provide more capacity and potentially provide for wider and cheaper coverage. In particular, where the existing cellular network already covers roadways the capital expenditure costs associated with using cellular mobile telecommunications techniques for ITS applications may be significantly less than what would be needed for setting up a new DSRC-based ITS network.

Accordingly, an Intelligent Transport System may rely on D2D communications of the kind proposed for mobile wireless telecommunications systems to allow vehicles to communicate with one another and with other terminal devices or network infrastructure equipment, such as a base station or specific road side infrastructure. In this regard, communications associated with connected vehicle systems may be conveniently referred to as V2X (vehicle-to-everything) communications, which may comprise V2V (vehicle-to-vehicle), V2P (vehicle-to-pedestrian) and V2I (vehicle-to-infrastructure). The V2X communications or terminals may also be referred to as vehicular communications or terminals, respectively. Infrastructure in this case may be a roadside ITS related infrastructure element, which may be referred to as a road side unit (RSU), or a conventional Internet or mobile network infrastructure element. Some examples or services in connected a vehicle context are Cooperative Awareness Message (CAM) and Decentralised Environmental Notification (DEN). These constitute applications such as allowing emergency vehicles to broadcast their presence and allowing roadside infrastructure to broadcast speed limit information to vehicles.

While most of the developments in the vehicular communications field have been focusing on the in-vehicle or vehicle-associated devices and systems, it is expected that future vehicular systems will in the future also have to address the situation of Vulnerable Road Users or VRUs. VRU are users or terminals that are V2X-compatible and that are associated with a vulnerable user (e.g. pedestrian, animal, bicycle, etc.). In the case of a pedestrian, the V2X-compatible device is likely to be a smartphone or a wearable device, which have different power consumption requirements than a V2X device installed in a vehicle for example, and even more so in the case of a wearable device. For at least this reason, the level of connected times cannot be expected from a VRU UE compared to an in-vehicle VUE for example. This can present a number of challenging when trying to detect the presence of a VRU (e.g. to inform a vehicle-associated UE and/or the VRU's UE of a potential danger) when the VRU is not always connected or when its presence and/or identity may not be known to the network.

SUMMARY

According to a first aspect of an example of the present disclosure, there is provided a method of activating a vehicular-capable terminal in a mobile telecommunications system, the mobile telecommunications system comprising a plurality of base stations operable to communicate with the vehicular-capable terminal and wherein at least one base station of the plurality of base stations is configured to operate as a road side unit and wherein the method comprises: the vehicular-capable terminal receiving a list of one or more base stations selected from the plurality of base stations; upon detection that the vehicular-capable terminal is within range of a first base station, the vehicular-capable terminal determining whether to activate, based on the list of base stations, a connection with the first base station; and upon determining to activate a connection with the first base station, the vehicular-capable terminal activating the connection with the first base station.

According to a second aspect of an example of the present disclosure, there is provided a mobile telecommunications system for activating a vehicular-capable terminal, the mobile telecommunications system comprising: a vehicular-capable terminal, and a plurality of base stations operable to communicate with the vehicular-capable terminal and wherein at least one base station of the plurality of base stations is configured to operate as a road side unit, wherein the vehicular-capable terminal is configured to receive a list of one or more base stations selected from the plurality of base stations; the vehicular-capable terminal is configured, upon detection that the vehicular-capable terminal is within range of a first base station, to determine based on the list of base stations whether to activate a connection with the first base station; and the vehicular-capable terminal is configured, upon determining to activate a connection with the first base station, to activate the connection with the first base station.

According to a third aspect of an example of the present disclosure, there is provided a mobile telecommunications system for activating a vehicular-capable terminal, the mobile telecommunications system comprising: a vehicular-capable terminal, and a plurality of base stations operable to communicate with the vehicular-capable terminal and wherein at least one base station of the plurality of base stations is configured to operate as a road side unit, wherein the vehicular-capable terminal and the plurality of base stations are configured to carry out together the above method.

According to a fourth aspect of an example of the present disclosure, there is provided a vehicular-capable terminal for use in a mobile telecommunications system, the mobile telecommunications system comprising a plurality of base stations operable to communicate with the vehicular-capable terminal and wherein at least one base station of the plurality of base stations is configured to operate as a road side unit, the vehicular-capable terminal comprising a transmitter, a receiver and a controller, wherein the controller is configured to: receive, via the receiver, a list of one or more base stations selected from the plurality of base stations; upon detection that the vehicular-capable terminal is within range of a first base station, determine based on the list of base stations whether to activate a connection with the first base station; and upon determining to activate a connection with the first base station, activate the connection with the first base station.

According to a fifth aspect of an example of the present disclosure, there is provided a vehicular-capable terminal for use in a mobile telecommunications system, the vehicular-capable terminal comprising a transmitter, a receiver and a controller, wherein the transmitter, receiver and controller together are configured to operate as the vehicular-capable terminal of any of the above mobile telecommunications system.

According to a sixth aspect of an example of the present disclosure, there is provided circuitry for a vehicular-capable terminal for use in a mobile telecommunications system, the mobile telecommunications system comprising a plurality of base stations operable to communicate with the vehicular-capable terminal and wherein at least one base station of the plurality of base stations is configured to operate as a road side unit, wherein the circuitry comprises a controller element and a transceiver element configured to operate together to: receive a list of one or more base stations selected from the plurality of base stations; upon detection that the vehicular-capable terminal is within range of a first base station, determine based on the list of base stations whether to activate a connection with the first base station; and upon determining to activate a connection with the first base station, activate the connection with the first base station.

According to a seventh aspect of an example of the present disclosure, there is provided a base station for use in a mobile telecommunications system, the mobile telecommunications system comprising a plurality of base stations operable to communicate with the vehicular-capable terminal and a vehicular-capable terminal, wherein the base station is one of the plurality of base stations and is configured to operate as a road side unit, the base station comprising a transmitter, a receiver and a controller, wherein the controller is configured to: transmit, via the transmitter, a list of one or more base stations selected from the plurality of base stations to the vehicular-capable terminal, wherein the list is for use by the vehicular-capable terminal to determine based on the list of base stations whether to activate a connection with a first base station of the plurality of base stations, upon detection that the vehicular-capable terminal is within range of a first base station.

According to a eighth aspect of an example of the present disclosure, there is provided circuitry for a base station for use in a mobile telecommunications system, the mobile telecommunications system comprising a plurality of base stations operable to communicate with the vehicular-capable terminal and a vehicular-capable terminal wherein the base station is one of the plurality of base stations and wherein the circuitry comprises a controller element and a transceiver element configured to operate together to: transmit, via the transmitter, a list of one or more base stations selected from the plurality of base stations to the vehicular-capable terminal, wherein the list is for use by the vehicular-capable terminal to determine based on the list of base stations whether to activate a connection with a first base station of the plurality of base stations, upon detection that the vehicular-capable terminal is within range of a first base station.

According to a first aspect of a further example of the present disclosure, there is provided a method of activating a vehicular-capable terminal in a mobile telecommunications system, the mobile telecommunications system comprising one or more base stations operable to communicate with the vehicular-capable terminal and one or more road side units operable to communicate with the vehicular-capable terminal, wherein the method comprises: a first road side unit detecting the presence of the vehicular-capable terminal; upon detection of the presence of the vehicular-capable terminal, the first road side unit notifying a first base station of the presence of the vehicular-capable terminal; upon notification of the presence of the vehicular-capable terminal, the first base station instructing the vehicular-capable terminal to connect to the first base station by transmitting an activation message wherein the activation message is addressed to a group of terminals comprising the vehicular-capable terminal; and in response to the activation message, the vehicular-capable terminal activating a connection with the first base station and/or with the first road side unit.

According to a second aspect of a further example of the present disclosure, there is provided a mobile telecommunications system, the mobile telecommunications system comprising: a vehicular-capable terminal, one or more base stations operable to communicate with the vehicular-capable terminal, and one or more road side units operable to communicate with the vehicular-capable terminal, wherein: a first road side unit of the one or more road side units is configured to detect the presence of the vehicular-capable terminal; the first road side unit is configured to, upon detection of the presence of the vehicular-capable terminal, notify a first base station of the one or more base stations of the presence of the vehicular-capable terminal; the first base station is configured to, upon notification of the presence of the vehicular-capable terminal, instruct the vehicular-capable terminal to connect to the first base station by transmitting an activation message wherein the activation message is addressed to a group of terminals comprising the vehicular-capable terminal; and the vehicular-capable terminal is configured to, in response to the activation message, activate a connection with the first base station and/or with the first road side unit.

According to a third aspect of a further example of the present disclosure, there is provided a mobile telecommunications system, the mobile telecommunications system comprising: a vehicular-capable terminal, one or more base stations operable to communicate with the vehicular-capable terminal, and one or more road side units operable to communicate with the vehicular-capable terminal, wherein the vehicular-capable terminal, the one or more base stations and the one or more road side units are configured to carry out together any of the methods of the further example.

According to a fourth aspect of a further example of the present disclosure, there is provided a vehicular-capable terminal for use in a mobile telecommunications system, the mobile telecommunications system comprising one or more base stations operable to communicate with the vehicular-capable terminal and one or more road side units operable to communicate with the vehicular-capable terminal, the vehicular-capable terminal comprising a transmitter, a receiver and a controller, wherein the controller is configured to: advertise the presence of the vehicular-capable terminal to a first road side unit of the one or more road side units; receive, via the receiver, an activation message from a first base station of the one or more base stations wherein the activation message is addressed to a group of terminals comprising the vehicular-capable terminal and is for instruct the vehicular-capable terminal to connect to the first base station; and responsive to the activation message, activate a connection with the first base station and/or with the first road side unit.

According to a fifth aspect of a further example of the present disclosure, there is provided a vehicular-capable terminal for use in a mobile telecommunications system, the vehicular-capable terminal comprising a transmitter, a receiver and a controller, wherein the transmitter, receiver and controller together are configured to operate as the vehicular-capable terminal of the mobile telecommunications system of the further example.

According to a sixth aspect of a further example of the present disclosure, there is provided circuitry for a vehicular-capable terminal for use in a mobile telecommunications system, the mobile telecommunications system comprising one or more base stations operable to communicate with the vehicular-capable terminal and one or more road side units operable to communicate with the vehicular-capable terminal, wherein the circuitry comprises a controller element and a transceiver element configured to operate together to: advertise the presence of the vehicular-capable terminal to a first road side unit of the one or more road side units; receive, via the receiver, an activation message from a first base station of the one or more base stations wherein the activation message is addressed to a group of terminals comprising the vehicular-capable terminal and is for instruct the vehicular-capable terminal to connect to the first base station; and responsive to the activation message, activate a connection with the first base station and/or with the first road side unit.

According to a seventh aspect of a further example of the present disclosure, there is provided a base station for use in a mobile telecommunications system, the mobile telecommunications system comprising one or more base stations operable to communicate with the vehicular-capable terminal and one or more road side units operable to communicate with the vehicular-capable terminal, wherein the base station is one of the one or more of base stations, the base station comprising a transmitter, a receiver and a controller, wherein the controller is configured to: receive a notification from a first road side unit of the one or more road side units, wherein the notification is for reporting a presence of the vehicular-capable terminal detected by the first road side unit; and upon notification of the presence of the vehicular-capable terminal, instruct the vehicular-capable terminal to connect to the first base station by transmitting an activation message wherein the activation message is addressed to a group of terminals comprising the vehicular-capable terminal.

According to a eighth aspect of a further example of the present disclosure, there is provided a base station for use in a mobile telecommunications system, the base station comprising a transmitter, a receiver and a controller wherein the transmitter, receiver and controller together are configured to operate as the first base station of the mobile telecommunications system of the further example.

According to a ninth aspect of a further example of the present disclosure, there is provided circuitry for a base station for use in a mobile telecommunications system, the mobile telecommunications system comprising one or more base stations operable to communicate with the vehicular-capable terminal and one or more road side units operable to communicate with the vehicular-capable terminal wherein the base station is one of the one or more of base stations and wherein the circuitry comprises a controller element and a transceiver element configured to operate together to: receive a notification from a first road side unit of the one or more road side units, wherein the notification is for reporting a presence of the vehicular-capable terminal detected by the first road side unit; and upon notification of the presence of the vehicular-capable terminal, instruct the vehicular-capable terminal to connect to the first base station by transmitting an activation message wherein the activation message is addressed to a group of terminals comprising the vehicular-capable terminal.

According to a tenth aspect of a further example of the present disclosure, there is provided a road side unit for use in a mobile telecommunications system, the mobile telecommunications system comprising a vehicular-capable terminal, one or more base stations operable to communicate with the vehicular-capable terminal and one or more road side units operable to communicate with the vehicular-capable terminal, wherein the road side unit is one of the one or more road side units and comprises a transmitter, a receiver and a controller, wherein the controller is configured to: detect the presence of the vehicular-capable terminal; and upon detection of the presence of the vehicular-capable terminal, notify a first base station of the one or more base stations of the presence of the vehicular-capable terminal for the first base station to instruct the vehicular-capable terminal to connect to the first base station by transmitting an activation message, the activation message being addressed to a group of terminals comprising the vehicular-capable terminal.

According to a eleventh aspect of a further example of the present disclosure, there is provided a road side unit for use in a mobile telecommunications system, the road side unit comprising a transmitter, a receiver and a controller, wherein the transmitter, receiver and controller together are configured to operate as the first road side unit of the mobile telecommunications system of the further example.

According to a twelfth aspect of a further example of the present disclosure, there is provided circuitry for a road side unit for use in a mobile telecommunications system, the mobile telecommunications system comprising a vehicular-capable terminal, one or more base stations operable to communicate with the vehicular-capable terminal and one or more road side units operable to communicate with the vehicular-capable terminal, the road side unit being one of the one or more road side units, wherein the circuitry comprises a controller element and a transceiver element configured to operate together to: detect the presence of the vehicular-capable terminal; and upon detection of the presence of the vehicular-capable terminal, notify a first base station of the one or more base stations of the presence of the vehicular-capable terminal for the first base station to instruct the vehicular-capable terminal to connect to the first base station by transmitting an activation message, the activation message being addressed to a group of terminals comprising the vehicular-capable terminal.

According to two further aspects of the present disclosure, there is provided computer software which, when executed by a computer, causes the computer to perform any of the methods discussed above and a storage medium which stores said computer software.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
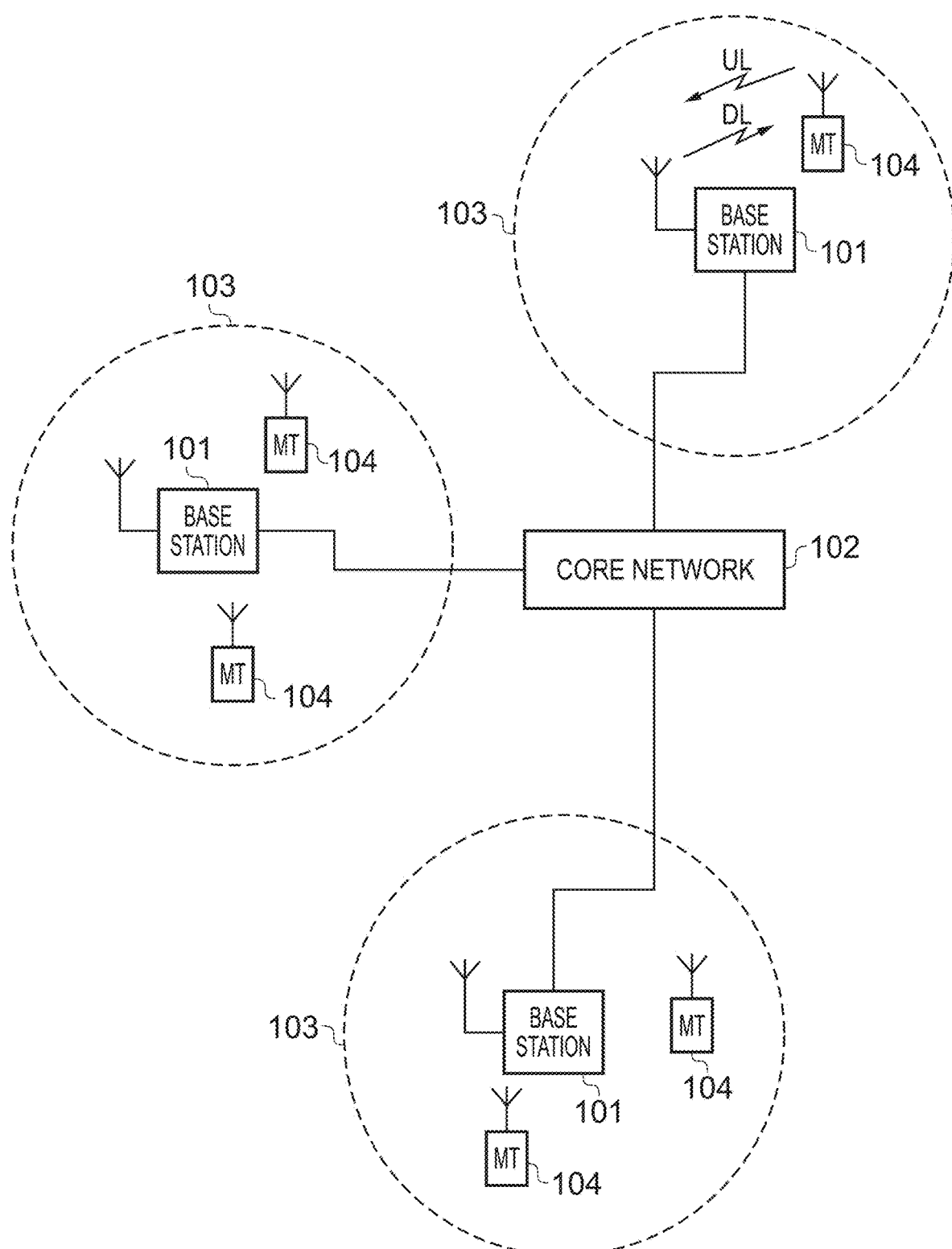
FIG. 1 provides a schematic diagram illustrating an example of a mobile telecommunications system.

FIG. 1 provides a schematic diagram illustrating some basic functionality of a mobile (cellular) telecommunications network/system 100, in this example operating generally in accordance with LTE principles, and which may be adapted to implement embodiments of the disclosure as described further below. Various elements of FIG. 1 and their respective modes of operation are well-known and defined in the relevant standards administered by the 3GPP® body, and also described in many books on the subject, for example, Holma, H. and Toskala, A. [1]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that may be used by the operator of the network 100. The core network 102 routes data to and from the terminal devices 104 via the respective base stations 101 and provides functions such as authentication, mobility management, charging and so on. In addition to the base stations 101 and terminal devices 104, the system may further comprise one or more relay nodes/devices. These may be used to enhance coverage for terminal devices operating in the relevant cell(s). The deployment of relay nodes (e.g. in terms of their locations) may follow generally established techniques for using relay nodes to support coverage in wireless telecommunications systems. In terms of terminology, it will be appreciated that terminal devices may also be referred to as mobile stations, user equipment (UE), user terminal, mobile radio, terminal, device, and so forth. Similarly, base stations may also be referred to as transceiver stations/nodeBs/e-nodeBs/eNBs, and so forth. Furthermore, relay nodes may also be referred to as relay devices/relays, and so forth. In some example implementations of the present disclosure, a terminal device may be operating as a relay node to assist in supporting communications associated with other terminal devices. That is to say, the functionality of a relay device may be provided by a suitably configured terminal device.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
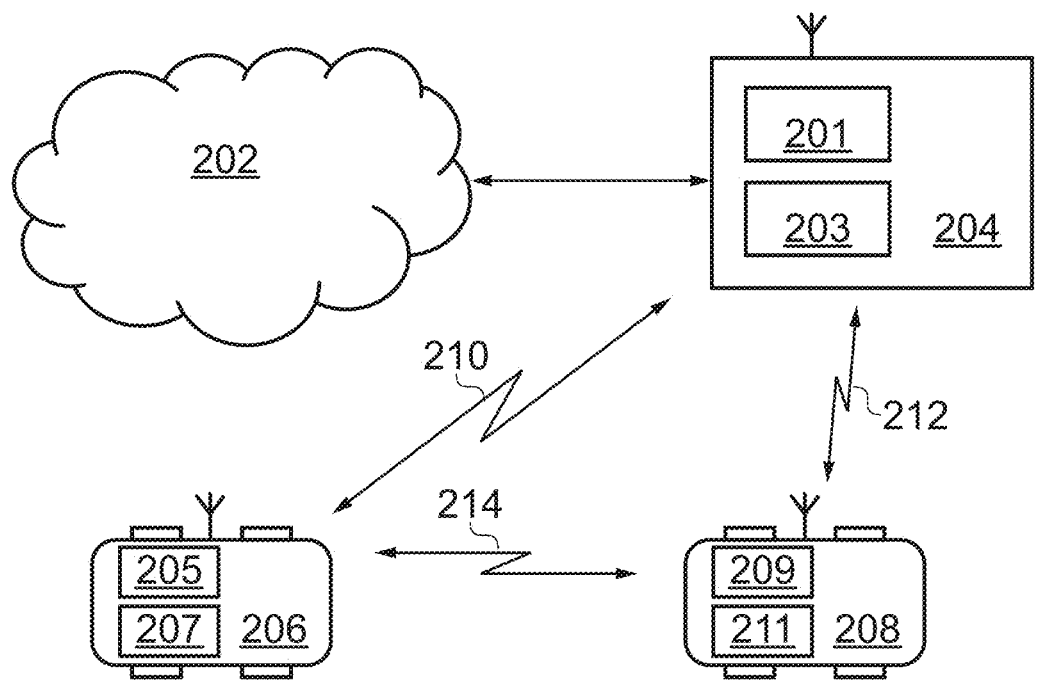
FIG. 2 schematically represents a wireless telecommunications system according to certain embodiments of the disclosure.

FIG. 2 schematically shows a telecommunications system 200 according to an embodiment of the disclosure. In particular, FIG. 2 represents an operating scenario in the context of an Intelligent Transport System (ITS) scheme whereby vehicles equipped with terminal devices are configured to support device-to-device communications (vehicle-to-vehicle communications) to allow them to communicate with one another to exchange information using the radio resources of the wireless telecommunications system 200. The telecommunications system 200 in this example is based broadly on an LTE-type architecture with modifications to support device-to-device communications (i.e. direct signalling exchange between terminal devices to communicate data between them) generally in accordance with previously proposed schemes for D2D communications. As such many aspects of the operation of the telecommunications system 200 are already known and understood and not described here in detail in the interest of brevity. Operational aspects of the telecommunications system 200 which are not specifically described herein may be implemented in accordance with any known techniques, for example according to the established LTE-standards and known variations and modifications thereof (e.g. to provide/introduce support for D2D communications in a vehicle-to-vehicle/ITS context).

It will be appreciated the information content of the communications between the vehicles is not significant to the principles underlying the operations described herein. Thus in any given case the information content will depend on the implementation at hand and the functionality the particular ITS scheme provides. For example, in some implementations the information exchanged through the vehicle-to-vehicle communications may comprise information regarding the speed and direction of the respective vehicles and relevant operating characteristics, such as whether the vehicle brakes are being applied and whether the vehicle is indicating an intention to turn/change direction.

The telecommunications system 200 comprises a core network part (evolved packet core) 202 coupled to a radio network part. The radio network part comprises a base station (evolved-nodeB) 204, a first terminal device 206 and a second terminal device 208. Each terminal device is deployed within a vehicle for providing vehicle-to-vehicle communication functionality. It will of course be appreciated that in practice the radio network part will comprise a plurality of base stations serving a larger number of terminal devices (vehicles) across various communication cells. However, only a single base station and two terminal devices are shown in FIG. 2 in the interests of simplicity for this Figure.

As with a conventional mobile radio network, the terminal devices 206, 208 are arranged to communicate data to and from the base station (transceiver station) 204. The base station is in turn communicatively connected to a serving gateway, S-GW, (not shown) in the core network part which is arranged to perform routing and management of mobile communications services to the terminal devices in the telecommunications system 200 via the base station 204. In order to maintain mobility management and connectivity, the core network part 202 also includes a mobility management entity (not shown) which manages the enhanced packet service, EPS, connections with the terminal devices 206, 208 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 202 to an external packet data network, for example the Internet. As noted above, the operation of the various elements of the communications system 200 shown in FIG. 2 may be broadly conventional apart from where modified to provide functionality in accordance with embodiments of the disclosure as discussed herein. It will further be appreciated that for other implementations which are based around wireless telecommunications systems operating in accordance with different standards, the network architecture may be correspondingly different.

The first and second terminal devices 206, 208 are D2D (more specifically, V2V) enabled devices configured to operate in accordance with embodiments of the present disclosure as described herein. The terminal devices 206, 208 each comprise a respective transceiver unit 205, 209 for transmission and reception of wireless signals and a respective controller unit 207, 211 configured to control the respective terminal devices 206, 208. The respective controller units 207, 211 may each comprise a processor unit which is suitably configured/programmed to provide the desired functionality using conventional programming/configuration techniques for equipment in wireless telecommunications systems. The respective transceiver units 205, 209 and controller units 207, 211 are schematically shown in FIG. 2 as separate elements. However, it will be appreciated for each of the terminal devices the functionality of the terminal device's receiver and controller units can be provided in various different ways, for example using a single suitably programmed general purpose computer, or suitably configured application-specific integrated circuit(s)/circuitry. It will be appreciated the first and second terminal devices 206, 208 will in general comprise various other elements associated with their operating functionality in accordance with established wireless telecommunications techniques (e.g. a power source, possibly a user interface, and so forth).

The base station 204 is configured to support communications with the terminal devices and may also in some situations for some examples play a role in configuring aspects of D2D communications between the terminal devices, for example establishing which radio resources may be used for D2D communications between terminal devices operating within the coverage area of the base station 204. The base station 204 comprises a transceiver unit 201 for transmission and reception of wireless signals and a controller unit 203 configured to control the base station 204. The controller unit 203 may comprise a processor unit which is suitably configured/programmed to provide the desired functionality using conventional programming/configuration techniques for equipment in wireless telecommunications systems. The transceiver unit 201 and the controller unit 203 are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 204 will in general comprise various other elements associated with its operating functionality. For example, the base station 204 will in general comprise a scheduling entity responsible for scheduling communications. The functionality of the scheduling entity may, for example, be subsumed by the controller unit 203.

Thus, the base station 204 is configured to communicate data with the first terminal device 206 over a first radio communication link 210 and communicate data with the second terminal device 208 over a second radio communication link 212. Both radio links may be supported within a single radio frame structure associated with the base station 204. It is assumed here the base station 204 is configured to communicate with the terminal devices 206, 208 over the respective radio communication links 210, 212 generally in accordance with the established principles of LTE-based communications. Nevertheless, it will be appreciated that some embodiments may be implemented without the respective terminal devices undertaking any base station communications, and in this regard the principles and some aspects described herein with regards to vehicle-to-vehicle communications may for some implementations be undertaken regardless of whether the respective vehicles (mobile terminals) are in coverage or out of coverage of a base station. Although the links 210, 212 have been illustrated as single bi-directional links, they can comprise or consist of an uplink and/or a downlink as commonly known to the skilled person.

In addition to the terminal devices 206, 208 being arranged to communicate data to and from the base station (transceiver station) 204 over the respective first and second radio communication links 210, 212, the terminal devices 206, 208 are further arranged to communicate with one another (and other terminal devices within the wireless telecommunications system) in a device-to-device (D2D) manner over a D2D radio communication link 214, as schematically indicated in the Figure. A direct communication link between two devices can sometimes be referred to a sidelink, which can be used to carry sidelink traffic such as D2D traffic. The underlying principles of the D2D communications supported in the wireless telecommunications system of FIG. 2 may follow any previously proposed techniques, but with modifications to support approaches in accordance with embodiments of the disclosure as described herein.

While vehicular communications can already present challenges in a mobile telecommunications network environment, when considering a VRU, the communications environment can be even more challenging. As previously mentioned, a VRU UE is more likely to be a smartphone or even a wearable device, such that the connection and battery requirements for the UE are entirely different from that of a device in an in-vehicle environment where it can for example be integrated to a car (and thus be power through a vehicle power system) or be connected to the vehicle power system, e.g. via a USB or cigarette lighter power connection.

As a result, it cannot reasonably be expected that a VRU UE (sometimes simply referred to as "VRU" in the interest of conciseness) will always remain in connected mode with the network and it is more reasonable to start from the assumption that a VRU UE is likely to be in idle mode. In this context, it can be difficult to discover a VRU, for example in order to initiate any warning and activation processes that may be appropriate in a V2X/vehicular system. In particular, one of the challenges faced in this situation relate to the fact that, in idle mode, a VRU UE may not receive or observe the V2X messages being sent in its vicinity.

More specifically, when in idle mode in current mobile network environment, the terminal would generally be expected to be in a RRC_Idle mode, where the terminal camps under a cell which it has measured to have the best downlink signal strength. The terminal can read paging channel periodically, wherein the paging intervals for the terminal are defined based on its IMSI. Otherwise the device goes into DRX mode between the paging intervals. Generally in mobile networks, the serving eNB is unable to reach the device unless it is being paged by the core network (which require prior knowledge of the IMSI of the device that it is paging), or unless the device chooses to establish RRC connection (for example to initiate a call and/or data transmission). Consequently, under the existing mobile network (e.g. LTE) protocols, it is very difficult to activate a VRU in a timely fashion when it is in idle mode but near an area where it should engage in V2X communications.

Figure 3:
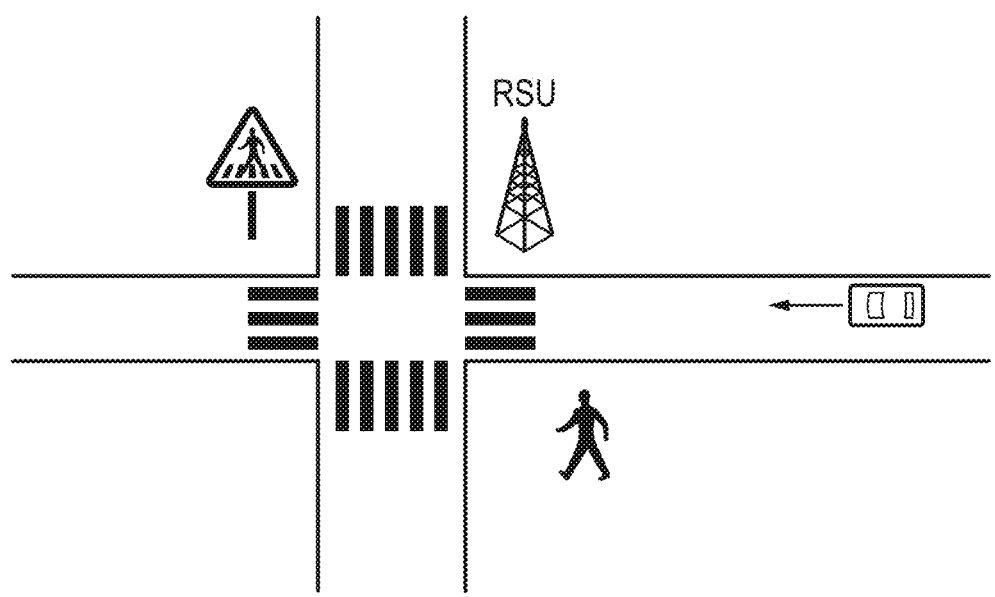
FIG. 3 schematically represents an example of a situation potentially dangerous for a vulnerable road user.

FIG. 3 schematically represents an example of a situation potentially dangerous for a vulnerable road user. In this example, a pedestrian and a vehicle are both approaching a junction and this could present a danger to the vehicle and pedestrian, with the pedestrian being most at risk. For example, when there are no traffic lights and/or when there is limited visibility and the pedestrian is intending to cross the road using the zebra crossing, in order to protect VRU (the pedestrian) the system would ideally discover that a VRU is near the zebra crossing and alerts vehicles approaching that there is a VRU present. At the same time, the system could also alert the VRU that a vehicle is approaching (also possibly inform the VRU on the direction from where the vehicle is approaching). When a road side unit (RSU) is in such an area, it can be used to communicate this danger to the VRU and/or vehicle once the potentially dangerous situation has been detected using vehicular communications.

As the skilled person will understand, it may not be useful to alert the VRU and vehicles where the VRU is far from any point of crossing. As a result, the system can be more efficient when the discovery can take place at a close proximity to the relevant danger area. Likewise, warning each and every VRUs in the range of a RSU through paging channel can also be very inefficient. In other words, for the system's efficiency to improve, it may be desired to have warnings which are geographically and timely relevant. Ideally, the RSU would detect the VRU device only when it is in the proximity of the point of crossing or of danger, after which the device is alerted to switch on its V2X communication functionality so that it can participate in the warning system (as a transmitter and/or receiver of warning information). For example, the VRU device may be alerted via the V2X communication interface and/or via the eNB in downlink. The challenge in alerting the VRU device is that it may be in idle mode. When the UE is in idle mode, it can generally only be accessed by paging messages from the eNB, which introduces the difficulty of identifying the relevant devices to contact through the paging messages. In particular, in view of the vehicular environment, this situation is different from that of an arriving phone call, where the device can be paged by its IMSI which is known before the terminal is to be paged. In this case, the identity of the device to contact is effectively unknown to the network as far as its IMSI is concerned such that sending a paging message directed to a specific VRU that is approaching a RSU and/or a high risk area cannot be done using conventional means.

In view of the challenges presented above in respect of vehicular communications and of VRUs, the safety and efficiency of vehicular systems (and in particular of warning vehicular systems) could benefit from being able to efficiently and reliably detect the presence of a VRU in the proximity of a dangerous area and alert the VRU (in particular if the device is in idle mode as this may involve the device switching to a connected mode).

In a first example of one or more techniques of the present disclosure, a vehicular-capable terminal is provided with a list of base stations (that also operate as RSU) and the terminal is configured to automatically change to connected mode when within range of one of these base stations. Accordingly, the terminal will be able to detect the presence of a RSU which may require the VRU UE to participate in a warning system.

Figure 4:
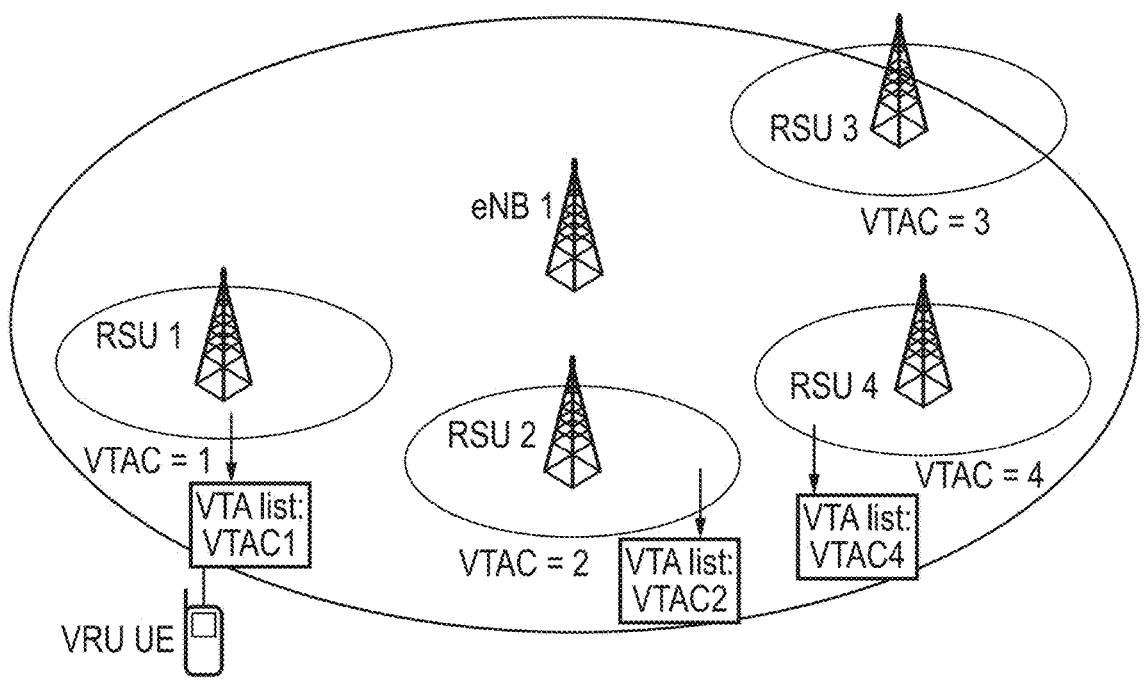
FIG. 4 schematically represents an example of a mobile network.

FIG. 4 schematically represents an example of a mobile network in accordance with the present disclosure. In this example, the network comprises a base station eNB1 operating as a conventional base station while four base stations RSU 1-4 also operate as RSUs. A vehicular-capable terminal, in this case a VRU UE, is also part of the network and is sent a list of RSU for determining which RSU to connect to. In the example of FIG. 4, the terminal is informed of the RSUs it should not connect to. For example, once connected to RSU1, VTAC1 can be added to the list communicated to the terminal to avoid a ping pong effect. However, in other examples, the list may indicate which RSU the terminal should connect to. In either case, the terminal can then determine whether to automatically connect to a RSU based on the list of RSUs, thereby automatically activating a terminal that was otherwise (and would have otherwise remained) in idle mode. In the present disclosure, the list of base stations/RSUs may also be referred to the VTA list where VTA stands for Vehicular Tracking Area and, likewise, the base stations in the list may be identified using a Vehicular Tracking Area Code (VTAC). In some examples, the VTAC may for example be the cell ID for the base station. In the example of FIG. 4, the cells for the RSU are generally smaller than that of the non-RSU eNB. Although this is not necessary and the cells could each be of any size, as appropriate, it is generally expected that the RSU will handle vehicular communications in a relatively limited area such that, in practice, the RSU cells are likely to be smaller than the non-RSU cells. Generally, the RSUs are expected to send a certain number of vehicular communications by broadcast such that, if the RSU cell is too large, the vehicular notifications may reach non-relevant devices (e.g. devices in a different road where no notification is required) and may thus result in unnecessarily notifying some terminals (thereby wasting wireless resources and power at both the RSU's and device's sides). This factor is one of the reasons why a RSU cell is expected to be smaller and, potentially, to operate as a small cell within coverage of base station. However in other examples the RSU cell may be larger and/or there may not be any overlay base station cell within which the RSU cell operates as a small cell and the example of FIG. 4 is for illustrative purposes only.

Figure 5:
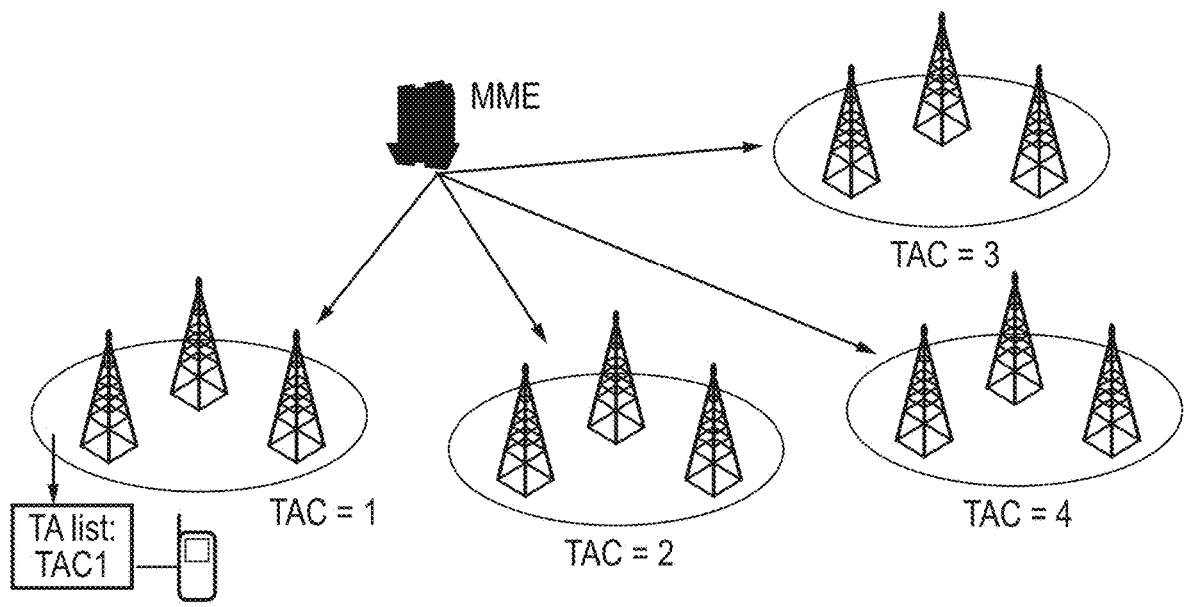
FIG. 5 schematically represents a legacy tracking area technique.

With a view to addressing the limitations discussed above regarding the discovery and activation of idle mode VRUs in V2X networks, each RSU/eNB of FIG. 4 would thus have a cell ID wherein UEs roaming in the area would be aware of which RSUs it should automatically connect to or it should not connect to. Also, with a view to minimising changes to the legacy system and idle mode, in some examples, the techniques of the first example can be implemented re-using the legacy Tracking Area "TA" techniques already available in the mobile networks. In order to illustrate the TA arrangements commonly found in mobile networks, FIG. 5 schematically represents a legacy tracking area technique. A device in idle mode generally does not connect to the network during idle mode mobility (e.g. from one base station to another) unless it performs a TA update. Tracking Areas are groups of base stations that constitute units (TAs) which the MME uses when paging UEs. In practice, the terminal updates the network only when it changes TA, not merely when it changes base station such that the network (and in particular the MME in the core network) only knows a UE's location on a Tracking Area level. If a terminal needs to be paged (for example because of an incoming call), the MME will request all of the base stations of the last known tracking area of the terminal to page the device. When the idle mode UE moves across a TA list border (which is identified using a list of TAs), that is when it hands over to a base station from another TA, it will then connects to the network (to the base station and to the EMM) and performs a TA update. During this update, the EMM will be aware of the new tracking area for this terminal and the terminal will be given a new TA list of Tracking Areas, which generally includes the TA that the UE just left (with a view to avoiding a ping-pong effect in TA updates). That is because, at present, TA lists include TAs that the terminal should not automatically connect to. Generally there is a balance to be found between the size of a Tracking Area (number of base stations per TA) and paging efficiency. With a smaller tracking area, it is easier for the MME to find where an idle mode UE is camping at and the amount of paging signalling can thus be reduced (as fewer base stations have to send the paging message for the terminal). On the other hand, with a larger TA, the UEs will have to perform fewer tracking area updates and thus reduce the amount of tracking updates signalling. Operators for example avoid having tracking area borders on busy roads or rail lines with a view to reducing the chances of having large amounts and/or bursts of TA updates when a large number of devices regularly cross the TA border of when large groups of devices cross the TA border at about the same time.

Returning to a case where the teachings of the present disclosure are to be applied to a legacy environment, the existing TA arrangements can be re-used to integrate the list of RSU for the terminal to connect to. It is noteworthy that the list of RSU, in its nature and its use, does not correspond to a TA list. First, the TA list identifies groups of base stations wherein, when a terminal moves from a first base station to another base station, it either stays within the same TA or it changes to another TA but it cannot find itself connected to a base station that is not part of a TA. In other words, the TAs represent contiguous areas of mobile coverage (with possible overlaps at the TAs' borders). On the other hand the RSU that could be included in the VTA list may not be contiguous ones and a terminal may find itself in an location where it is connected to a base station and/or a RSU but is however not within coverage of any of the RSUs (base stations) that could be listed in a VTA list (whether the VTA list is a positive definition of RSUs to connect to or a negative definition of RSUs not to connect to). Additionally, a tracking area includes a plurality of base stations whereas each element in the VTA list generally relates to one base station only. Also, the TA updates are used for the terminal to update the MME when it changes TA so that the MME knows where to page a terminal, whereas the VTA are not for use for paging a terminal such that the MME does not have to even be made aware or be updated on of the localisation of the terminal when it connects to eNB-based RSU. Moreover, as will be further discussed below, the type of connection set up between the terminal and/or the radio access network parts of the network once the terminal enters within coverage a listed RSU can also differ as the vehicular-enabled terminal may only connect to the base station/RSU and not to the MME or to another element in the core network.

Despite these differences between the TAs and VTAs, in an example of the present disclosure, it can be made use of the transmission of the list of TAC to a terminal, to include information on the list of RSUs at the same time. This could also reduce the changes to the terminal as the terminal could use both the list of track areas and the list of RSUs (vehicular tracking areas) to determine when to transition out of the idle mode to the connected mode. Accordingly for vehicular-capable terminals can be managed at the same time as non-vehicular capable terminals for tracking areas updates and separately for vehicular communications and in particular for connection to RSU for vehicular communications. Accordingly non-vehicular-capable devices would only use the TA list while the vehicular-capable devices would use the TA and VTA list when dealing with idle mode mobility. Accordingly, the legacy idle mode mobility can still be used in this example. As the skilled person will understand, while this implementation can reduce the changes to the legacy system, both from a network's perspective (for communicating the list to the terminals) and from a terminal's perspective (for determining when to leave the idle mode), in other examples a different method may be implemented for communicating the list of base stations to the terminals and for the terminals to know when to connect to a base station automatically based on the list. For example, the list may be sent separately to a vehicular-capable terminal any time (or sometimes, when) it connects to a base station and/or the process for the terminal to determine when to connect to a base station/RSU may be carried out by the terminal separately from the process to determine when to connect to the network when entering a new tracking area.

In cases where the TA update procedures otherwise available for updating the tracking area of a terminal are re-used for sending the list of eNB-based RSU and for the terminal to automatically connect to the listed RSUs, while the tracking area lists and tracking area codes for TA update and for vehicular communications would be separate, VTA codes could be provided in a manner similar to that for TA codes. In current LTE systems a TA is identified with a Tracking Area Identity (TAI) which is defined in TS 23.003 [2] as follows:

The Tracking Area Identity (TAI) consists of a Mobile Country Code (MCC), Mobile Network. The TAI is composed of the following elements:
Mobile Country Code (MCC) identifies the country in which the PLMN is located. The value of the MCC is the same as the three digit MCC contained in the IMSI;
Mobile Network Code (MNC) is a code identifying the PLMN in that country. The value of the MNC is the same as the two or three digit MNC contained in the IMSI;
Tracking Area Code (TAC) is a fixed length code (of 2 octets) identifying a Tracking Area within a PLMN. This part of the tracking area identification shall be coded using a full hexadecimal representation. The following are reserved hexadecimal values of the TAC:
0000, and
FFFb.

In other words, TAC is a 16-bit number which together with the Mobile Network Code and Mobile Country Code constitutes the Tracking Area Identity (TAI). While some documents (e.g. U.S. Pat. No. 8,537,751 [3]) discuss TA updates, they generally focus on conventional TA update techniques and on reducing the amount of signalling for the TA update procedure but are not directed to vehicular environment, let alone to the discovery of V2X terminals that are otherwise in idle mode.

As for the purposes of the VRU discovery, the "vehicular" tracking areas may not be continuous or contiguous and are expected to be more like hot spot areas around each of the relevant/listed RSUs. Also, as the VTA are not used for paging, a vehicular tracking area may not have a unique TAI because it will not be used to reach to the terminal through paging. As a result of this use and of this distribution of VTAs, having multiple VTAs with the same identifier may not cause problems and only a limited number of TAIs may be used for identifying the VTA for the selected RSUs. In some examples, the TAI for RSUs can be constructed such that it identifies that the TA is a VTA, for example when considering the example of the currently used TAI, using the reserved 0000 or FFFF TAC could indicate to the terminal that the TAI relates to a VTA. Accordingly legacy terminal could ignore these TAI as reserved ones and thus process the conventional non-vehicular TA only while vehicular-capable terminals may identify these TAI as relating to VTA and thus use the information associated with these TAI to identify the listed VTAs in the list of TAs and VTAs it has received. As another example, in a case where the list of VTAs defines which VTAs the terminal should not connect to, a TAC available in the current list of TACs could be dedicated to VTAs, and it will always be included in a TA list that is provided for legacy terminals. Thus, the VTA is always included in legacy terminals' TA lists and entering an RSU coverage area won't trigger a TA update for those terminals. In practice, limiting the size of the VTA list to one RSU can assist with the VRU UE exiting idle mode when it comes within coverage of another RSU not listed in the UE's current VTA list (see for example FIG. 4) when the list defines which RSUs the terminal should not connect to. This can help with the VRU registering with the base station (and optionally network) to become contactable or reachable via V2X signalling when it is in the proximity of a relevant eNB-based RSU. For example, when a pedestrian carrying a VRU device (which is in idle mode) approaches an intersection with an eNB-based RSU on it (see for example FIG. 3), the device can detect that it is crossing into a new VTA (either because it is not in the current list identifying which VTA not to connect to or because it is in the current list identifying which VTA to connect to) and will establish an RRC connection with the serving base station. In this manner, the device can automatically become active when it is in the proximity of an appropriate RSU using the VTA list, without implementing tracking or discovery-like techniques to detect the position of the terminal. On the other hand, when the terminal is not under coverage of a listed eNB-based RSU, the device can remain in idle mode if need be and thus save battery by only connecting to the relevant eNB-based RSU.

Figure 6:
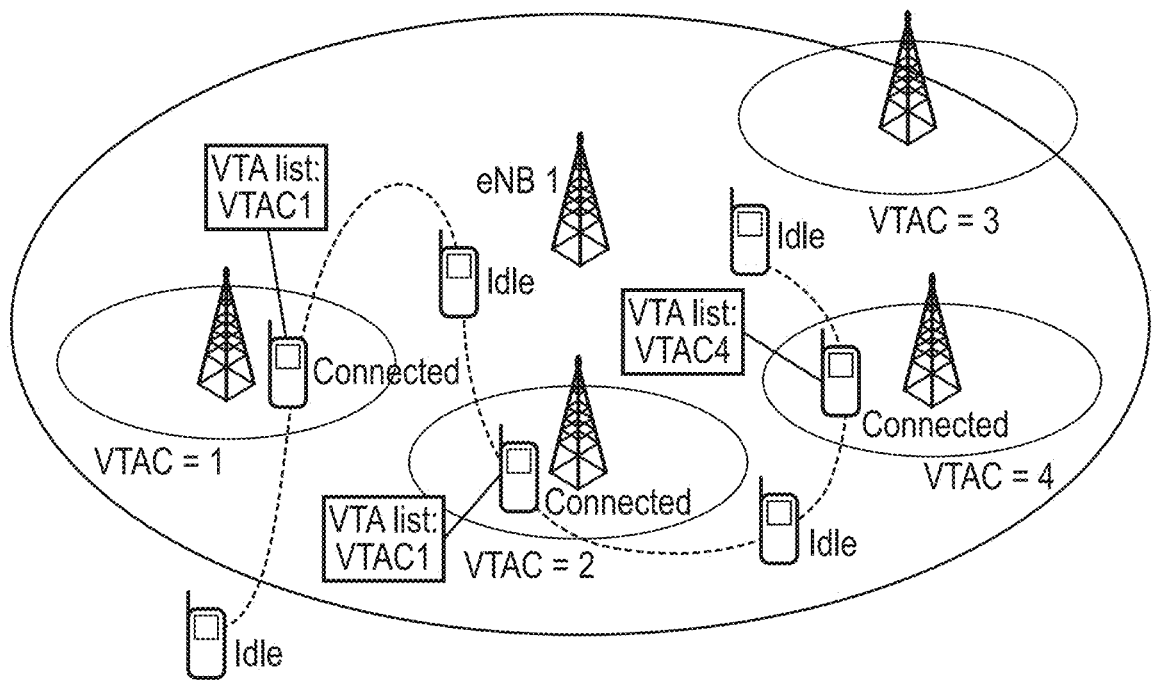
FIG. 6 schematically represents an example of a VRU terminal moving across a network in accordance with the present disclosure.

FIG. 6 schematically represents an example of a VRU terminal moving across a network comprising RSUs. In particular, it depicts the track of VRU UE originally in idle mode. The VRU UE moves in an area which is sometimes within coverage of one of RSUs 1-4 and sometimes outside coverage. It is pointed out that in the example network in FIGS. 4 and 6 (and FIG. 7 discussed below) the RSUs are within coverage of a conventional (non-RSU) base station and of the same conventional base station. This configuration is however entirely illustrative and in other examples some or all of the RSUs may not be within coverage of a conventional base station at all or may be within coverage of a different conventional base station compared to at least one of the other RSUs. Likewise the example of FIG. 6 (and FIG. 7) is based on a list identifying which VTA the terminal should not connect to but the same teachings apply equally to a case where the list defines which RSU the terminal should connect to. Returning to the VRU of FIG. 6, it is originally in idle mode and when idle mode measurements detect a reasonably strong signal from RSU1 (the TAC of which is not on the TA list), the UE determines that it has entered a new VTA based on the TA list. The UE then establishes an RRC connection to RSU1 which can enable V2X connectivity such that the VRU can communicate with this RSU and, potentially, with other V2X UEs in the vicinity. In a case the UE actually continues with Tracking Area update with the core network or in a case where RSU1 and/or eNB1 are configured to update the TA list for the terminal (even if only the part of the TA list relating to VTAs) or to update the VTA list for the terminal (e.g. if it is provided separately from the TA list), its TA list would be amended to have this VTAC (VTAC1) added but no other VTACs for relevant RSUs that the terminal should connect to, if within range (in addition to the normal TA list it would be provided for legacy idle mode mobility purposes). Later on, the VRU leaves the coverage area of RSU1 and is released back into idle mode. When the VRU moves into the coverage of RSU2, the VRU UE again detects a new VTAC which is not in its current TA list and transitions into connected mode just as discussed above in respect of RSU1. Likewise, the UE can then engage in V2X/vehicular communications with RSU2 and potentially other V2X devices in the vicinity. This process is repeated when the VRU moves out of coverage of RSU2 (back to idle mode) and then into coverage of RSU4 (back to connected mode).

As mentioned above, when the UE enters RRC connected mode after finding a VTAC which is not in its current TA list, the TA list may or may not be amended. If the list is not amended, it continues to have the same VTACs in it (and potentially no VTACs in it) and the UE always exits RRC idle mode when detecting a VTAC not in the list. If the TA list can be amended (by the core network, the RSU the terminal is connected to or a base station within range) and, in some cases, it would be amended to include the current VTAC in order to allow the UE again to find the next RSU VTAC as being outside the list and enforce switch into RRC connected mode.

Figure 7:
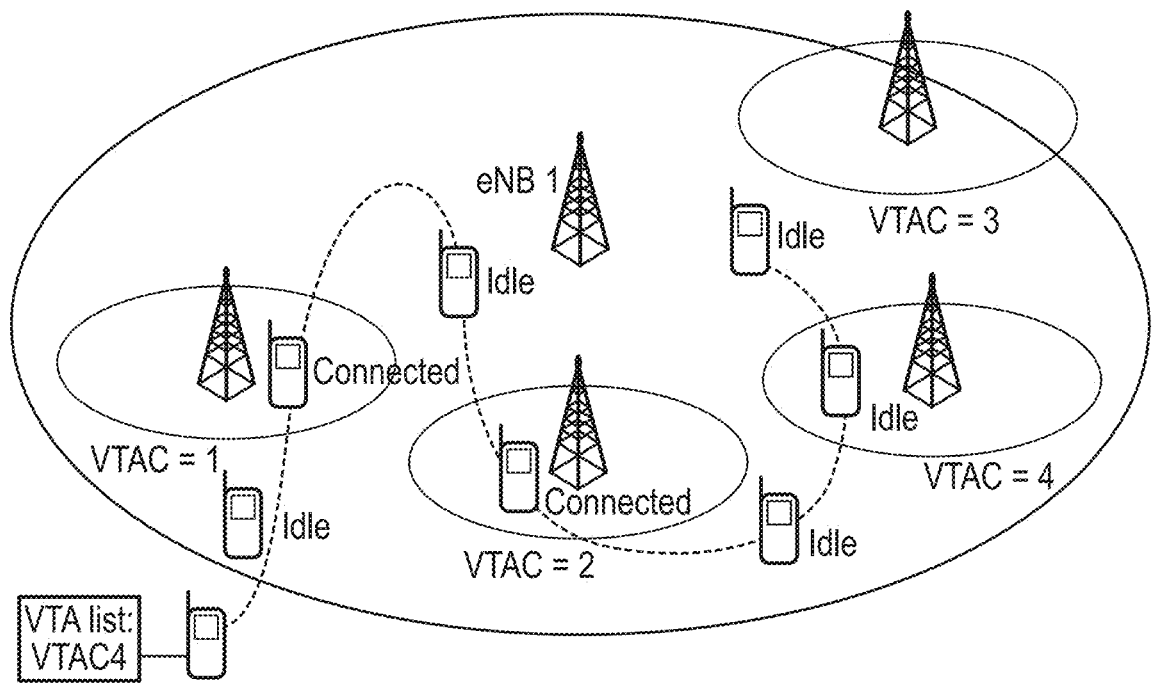
FIG. 7 schematically represents another example of a VRU terminal moving across a network in accordance with the present disclosure.

FIG. 7 schematically represents another example of a VRU terminal moving across a network comprising RSUs. This second example is setup in a network which is similar to that of FIGS. 4 and 6 however in this case RSU 4 remains listed in the VTA list for the terminal as it moves through the network. In comparison to the arrangement discussed in respect of FIG. 6, in this example the terminal will automatically enter RRC connected mode when within range of RSU1 or RSU2 but when it enters the coverage area of RSU4 it will not automatically enter RRC connected mode as RSU4 is already listed in the current VTA list. For example, RSU4 may not be associated with a high-risk zone for the VRU such that it is not considered necessary for VRU UEs to enter RRC connected mode as it is not expected that the VRUs or that many VRUs will need to be part of a VRU warning system when using this RSU. Accordingly a vehicular-enabled terminal may enter the cell of eNB-based RSU and may not always automatically connect to it but will only connect to the selected ones that will be identified based on a list communicated to the terminal (e.g. identifying RSU to connect to or not to connect to).

In some examples, when the terminal transitions into connected mode with the RSU, it can activate a connection to the RSU (e.g. transitioning into an RRC_connected mode) and while in a conventional arrangement the terminal would then also connect to the core network (e.g. to the MME), the terminal may not set up any connection with the core network of the mobile network and, for example, may not set up any connection with the MME or any other type of anchoring element of the core network. While this type of connection would be unconventional and would go against the usual connection modes and techniques of mobile networks, in the present situation, it can reduce the amount of signalling and power consumption for the terminal at least. Also, as the localisation of the terminal does not have to be updated for paging purposes when the VRU connects to a listed RSU and as the terminal does not connect to the network with the intention to exchange data via the core network (e.g. with a remote element such as a web server, a VPN server, etc.), the terminal is unlikely to suffer from this limited connection to the core network portion of the mobile network. As the skilled person will understand, the network can still page the terminal if need be and the terminal can still connects to the core network if it wish, for example if it wish to connect to a remote element via the internet. In practice and using the terminology presently used in current networks, once the RRC connection with the listed RSU is established, it may be sufficient for the VRU UE to only engage in vehicular communications within the RSU coverage area and the S1 interface bearer towards the core network can be dispensed with.

Also, terminal that will make use of the list of RSU and/or that will receive the list may not include all terminals. In some examples, all terminals will receive this list information (e.g. as part of a more general TA list), while in other examples only selected terminals will receive this list information. For example, only terminals that are vehicular-capable will receive the list and, optionally, only terminals that are vehicular capable and that are identified as being associated with a VRU or as being likely to be associated with a VRU (e.g. a wearable wristband, a bicycle device, a device for a dog collar, etc.). This may for example be based on the assumption that non-VRU V2X devices are likely to be always connected to the network and that VRU V2X devices are likely to be in idle mode most of the time. In other cases (for example if it is believe that this assumption cannot reasonably be made), all V2X devices may connect to the listed RSUs such that both VRU and non-VRU terminals can be made aware of each other, if need be. Also even in cases where a large number of terminals receive the list information, only the vehicular-enabled or some of the vehicular-enabled devices may make use of this information as deemed appropriate.

Figure 8:
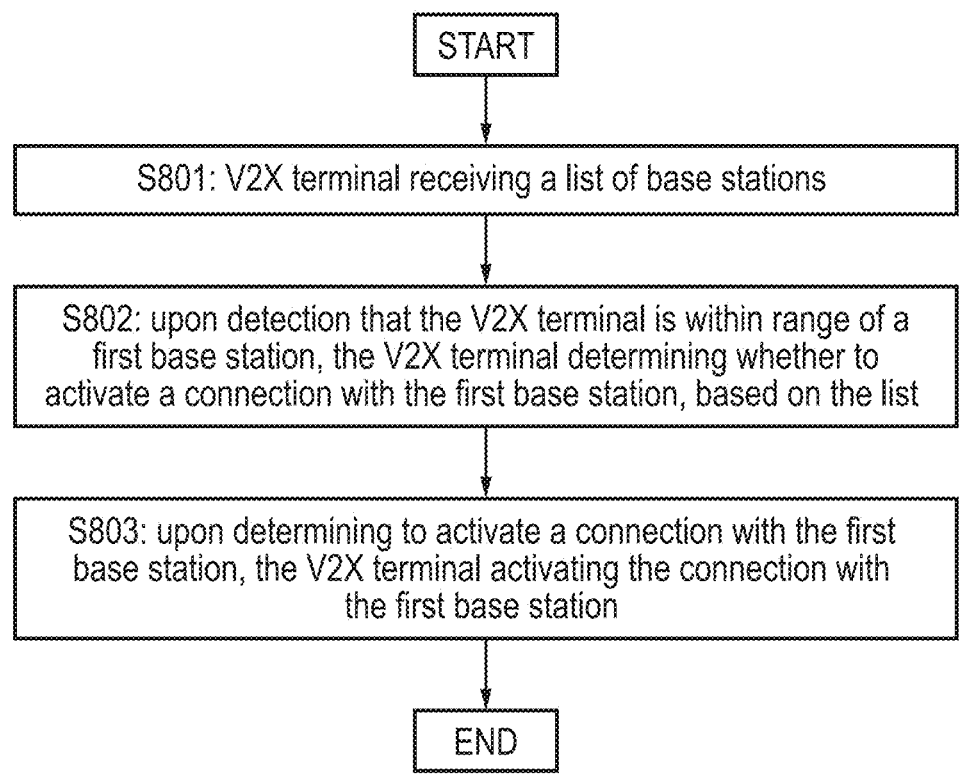
FIG. 8 schematically illustrates an example method of activating a V2X terminal in a mobile telecommunications network.

FIG. 8 illustrates an example method of activating a V2X terminal in a mobile telecommunications network. The method starts and at S801, a V2X terminal receives a list of base stations. For example the RSUs may have been selected based on the level of risks for VRUs in the area and the list may in some cases include any relevant base station(s) that the terminal should not connect to (e.g. base stations associated with a VTAC/TAC that the terminal should not connect to) while in other cases it can include any base station(s) that the terminal can connect to (e.g. comprising a subset of some of or all of eNB-based RSUs in an area around the terminal). Then, at S802, upon detection that the V2X terminal is within range of a first base station of the list, the V2X terminal determines whether to activate a connection with the first base station, based on the list. For example, depending on the type of list used in an implementation, the terminal may determine whether the first base station is not on the list or is on the list. Then, upon determining to activate a connection with the first base station, the V2X terminal activates a connection with the first base station at S803.

Accordingly, using the teachings and techniques discussed in the present disclosure, the terminal can automatically connect to the relevant RSUs, which may for example be associated with a high-risk zone for VRUs, thereby saving battery while out of range of the listed RSUs and being able to engage into vehicular communications when in proximity of a RSU. Also, as the terminal will connect to RSU that are or are not included in a list (e.g. a Tracking Area list in some examples) it received from the network, the network may dynamically adapt the list depending on the information available, whether regarding the VRU risk level of one or more areas (which can for example be adjusted based on a number of incidents, a time of day, a date, a luminosity level, etc.), regarding an estimated number of terminals in an area (e.g. when a large number of pedestrian are present, a driver may already be attentive to pedestrian but the risk to pedestrian may be increased if a driver is not aware of the presence of any pedestrian) or regarding any other element or information which may affect the risk to the VRUs in an area and/or which may affect the decision to notify drivers and/or VRUs in an area.

It is noteworthy that the list of RSUs/base stations communicated to a V2X device may be communicated by any base station and/or RSU as appropriate. In some examples a first one is sent to the terminal when it first connects to the network and it can then be updated when the terminal connects to a RSU (e.g. to a listed/not listed RSU, when the device wishes to engage in V2X communications, etc.) and/or to a base station (e.g. to carry out a TA update when the base station is listed or not listed on the TA list-depending on the type of list used—when the terminal otherwise connects to the network to exchange data and/or when it has been paged, etc.).

As mentioned above, on some examples, in a case where the mobile telecommunications network is configured such that, when the V2X and/or non-V2X terminal connects to the network, the vehicular-capable terminal connects to an element in a core network portion of the mobile telecommunications network (e.g. an anchor element of the core network such as an MME) but when a terminal connects a RSU because it is or is not on the list (depending on the type of list selected) it has received, for example in a Tracking Area list, then the terminal connects to the base station/RSU but not to the element in the core network. Viewed from one perspective, the terminal connects to the base station and optionally to any other element in the radio access network ("RAN") but does not connect to any element in the core network. While the connection to the RAN may cause signalling to be sent to the core network (e.g. for billing or monitoring purposes), the terminal itself does not establish a connection with the core network.

Also, while in the present disclosure the examples generally discuss the idle and connected mode as being the RRC idle and connected modes, the skilled person will understand that this is based on the current configuration of mobile networks and of connections between terminals and base station but that the same principles and teachings would apply equally in a network with a different configuration and with different types of connections between terminals and based stations.

Moreover, in some examples the list of eNB-based RSUs may be associated with timing information for the V2X terminal to connect to the listed RSUs (e.g. at night the risk for VRU may be increased such that the terminal may be instructed, via the list, to connect to these RSUs only at certain times of day) and/or terminal type information. For example, a V2X UE that is associated with a pedestrian may connect to different RSUs compared to a V2X UE associated with a bicycle or an animal for example. Accordingly the terminal type information may identify to which type or types of terminals one or more of the listed RSUs apply to. In some examples, the timing and terminal type information may be used together such that the effective list of RSUs that a terminal will connect to will sometimes depend on both the time and the terminal type (e.g. timing information may apply to a first type of terminals but not to a second type of terminals).

In other examples, with a view to communicating with VRU UEs, the VRU UEs can notify RSU of their presence, for example using low-power technologies such as Bluetooth ("BT"), LC-MTC (Low Complexity-Machine Type Communications) or other radio interfaces and technologies may be considered for the discovery purpose. For example, the VRU may announce its presence using a BT beacon sent on a regular basis for discovery purposes or using any other type of technology and techniques for the terminal to announce its presence. Accordingly, a RSU may intercept this discovery/presence message and may thus become aware of the presence of the terminal in its proximity. However, while the presence of a VRU UE may be known to the RSU and thus potentially to the network, the identity of the VRU UE that has announced its presence is unlikely to be known. As a result, if the terminal is to be warned by the network for vehicular warning purposes, the network does not know how to contact the VRU that has announced its presence. As previously mentioned, VRU UEs are unlikely to be regularly or continuously connected to the network and are expected to be in idle mode most of the time such that, when in idle mode, the network does not know which UE to contact for V2X warnings.

In a second example of one or more techniques of the present disclosure, there are provided teachings and techniques wherein a vehicular-capable terminal can be activated, after it has announced its presence, by sending an activation message instructing the vehicular-capable terminal to connect to a base station wherein the activation message is sent to a group of terminals comprising the vehicular-capable terminal. In accordance with the teachings of the present disclosure and of this second example, there is therefore provided a method for detecting the presence of a VRU in a V2X environment such that the V2X enabled vehicles (or any relevant type of V2X device) may be warned about the presence VRU if appropriate.

Figure 9:
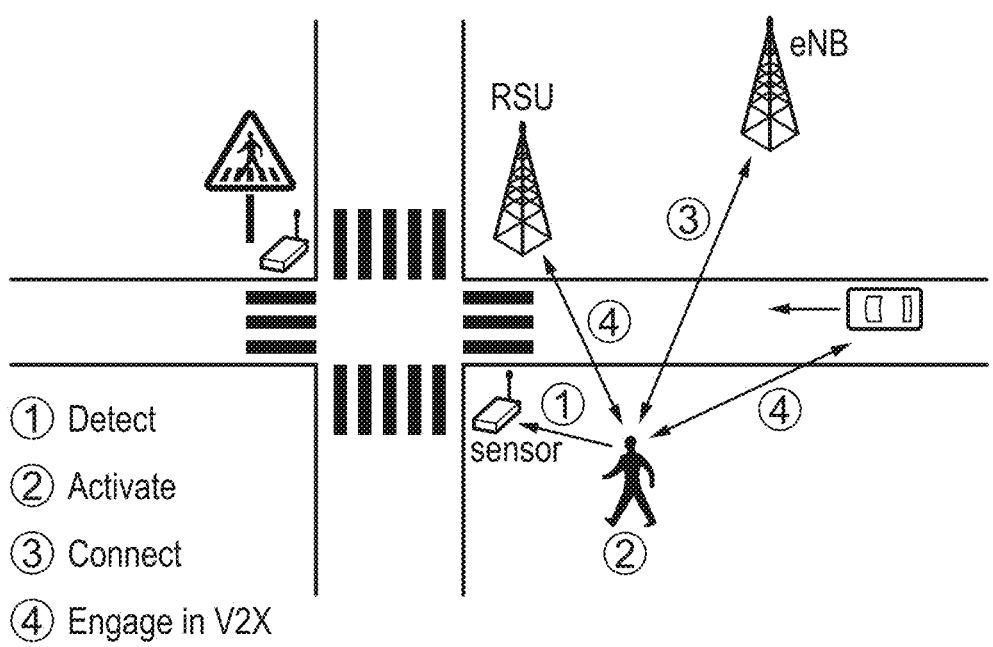
FIG. 9 schematically illustrates an example sequence for activating a vehicular-capable terminal.

FIG. 9 illustrates an example sequence for activating a vehicular-capable terminal. In this example, the VRU UE first notifies its presence to a detector or sensor associated with a RSU. It is noteworthy that a RSU may be associated with one or with more than one sensor (it is for example associated with two sensors in the example of FIG. 9). Then, at the second stage, the VRU UE is activated in accordance with the teachings of the present invention. This activation results in the terminal connecting to a selected base station (stage 3) and then at stage 4, the VRU can engage in vehicular communications. While the techniques to be used for stage 1 of the procedure are outside the scope of the present disclosure, the techniques presented herein facilitate stages 2-4 of this procedure, in particular stage 2 of the procedure.

Figure 10:
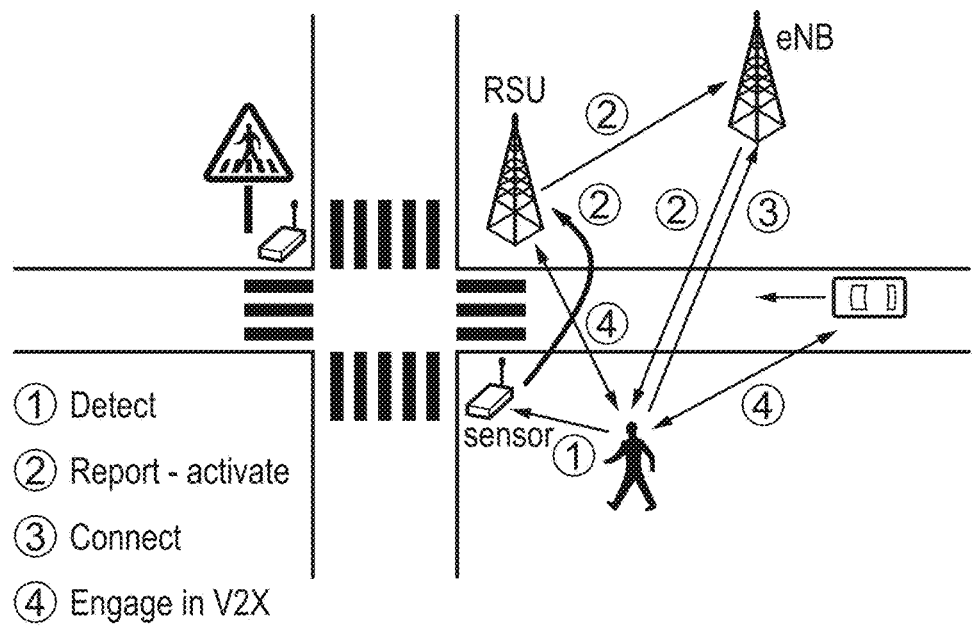
FIG. 10 schematically illustrates another example sequence for activating a vehicular-capable terminal.

In a first implementation, illustrated with reference to FIG. 10, the terminal is activated using a paging message from the base station once the presence of the VRU is detected near a sensor. In some examples, the paging message could be sent as a conventional message to all terminals in the paging area covering the sensor. However, this would result in all of the terminals in the relevant paging area for the sensor/RSU/eNB being asked to connect to the network at the same time when only one terminal is intended to connect. As a result a significant amount of wireless and power resources will be used unnecessarily and, in view of the important waste of paging and uplink RACH resources, this solution is unlikely to be adopted by network operators in practice.

In some examples, a dedicated V2X and/or VRU IMSI may be used with existing paging processes. This could assist in identifying which UEs will activate in response to the paging message. Conventionally, a UE has a unique IMSI (from its SIM card), which determines at which paging occasions it reads the paging channel. The UE is paged by the core network based on a combination of its IMSI and core network identification for the UE. However, as previously discussed, a VRU device that has been detected in an area may not be known to the core network by its identifier such that it then cannot be paged by the core network using its IMSI. However, once the eNB knows that there are one or more VRU devices that need to be activated, it could send/request a paging message to be sent to that particular dedicated IMSI that the vehicular-capable and/or VRU UEs can receive and respond to. Additionally and optionally, the use of the V2X IMSI could mean for the terminals that, by default, they have to get V2X connected, but not necessarily RRC Connected or connected to the core network, unless they have been paged conventionally and/or unless they wish to establish a connection with the base station and/or core network for any other reasons.

In other examples, a specific RNTI may be configured for vehicular-enabled terminals only and, optionally one may be configured for VRU terminals only. As for the dedicated IMSI, vehicular-enabled terminals or VRU terminals, respectively, would accordingly understand the paging message to be directed to them and carry on with the discovery and activation procedure while other terminals would simply not read or ignore the paging messages with this type of specifically allocated RNTI. While this would result in all other V2X devices or VRUs devices—respectively—in the relevant area (e.g. the tracking area for paging the area covering the sensor) entering a connected mode regardless of whether they are near a VRU sensor or not, in view of the compatibility with existing mobile networks techniques and procedures, such an implementation could be considered worthwhile. In other words, while this implementation would result in a waste of resources, the waste is reduced compared to paging all devices and the compatibility as sufficient to counterbalance the waste of resources in some cases.

In other examples, rather than re-using existing paging mechanisms, the paging of the terminal can be carried out in an even more targeted manner with a view to reducing the number of terminals that may have to connect to the network unnecessarily. In particular, the core network (e.g. the MME in the case of paging) may not be involved in the usual manner. In particular, the main purpose of the paging message is to activate the VRU device to return to active state so that it can start observing and communicating with its surroundings for vehicular communications and services, which need not involve the MME or core network like for an incoming call for example. With this in mind, in some examples, only a base station selected for the notified sensor and/or RSU may send a paging message to activate the terminal. As for the case where an entire tracking area is paged, in some implementations this paging by a base station may be carried out using a specific RNTI/IMSI allocated to V2X and/or VRU device notification or using any other means suitable for activating only the devices supporting VRUs and/or V2X communications. In other words, with such a base station-based paging, the VRU device is not paged by the core network according to conventional paging mechanisms, but is paged by a local eNB for the purpose of V2X communications.

Once the device has been activated, it can then connect to the base station (stage 3) and, optionally, to the network and, once it is connected, it can engage in V2X communications if appropriate (stage 4) and it can for example start receiving VRU warning messages sent in its vicinity. In cases where the terminal connects to the network following a paging message from the base station only, then from core network point of view the connection appears to be coming from the VRU device initiating a call/connection as the terminal appears to request an RRC connection and a connection to the MME (and/or any other appropriate element of the core network) without a previous request from the core network side for the terminal to connect. For example, the terminal may already be aware that the activation is for V2X purposes (e.g. because a V2X RNTI/IMSI was used, as discussed above) or because of a V2X indicator in the activation message from the base station, and it may thus decide to connect to the base station only and not to connect to the core network as it would otherwise do (e.g. if it is not aware that the activation is for V2X services only or if it is configured to always connect to the core network).

Also, in some examples and as discussed in respect of the first example above, the terminal may only set up a connection to the RSU and/or to the local base station without setting up a connection to the core network such that it can engage in local V2X communications without core network connectivity. As previously discussed, this may in some cases involve some signalling in the core network (e.g. for billing and/or monitoring) but in terms of data connection the core network is not aware of the terminal being active. In other words, unless the terminal otherwise requires setting up end-to-end bearers (e.g. for data communication via the internet), the communication would only involve V2X connectivity to nearby other V2X devices, and thus the involvement of the MME and the S1 interface in the process may be different than in a traditional cellular call set-up.

The base station that is used for the local paging and/or for the local connectivity in accordance with the teachings proceeded above may be selected for example based on its coverage area and its current load. For example, some localisation information may be derived from the location of the sensor and/or RSU that has detected the presence of the terminal and one or more base stations covering this area may be identified. If a plurality of base station have thereby been identified, a base station may be selected based on any suitable criterion or set of criteria, for example based on the current load of the identified base stations. In some examples, the paging may also be performed by two or more base stations. For example, if a sensor and/or RSU are located within coverage of two base station near the borders of each base station, then both base station may be selected for paging the terminal as the VRU may for example only be reachable via one of the two base station but it may not be known in advance which one is expected to be the most likely base station covering the VRU.

Figure 11:
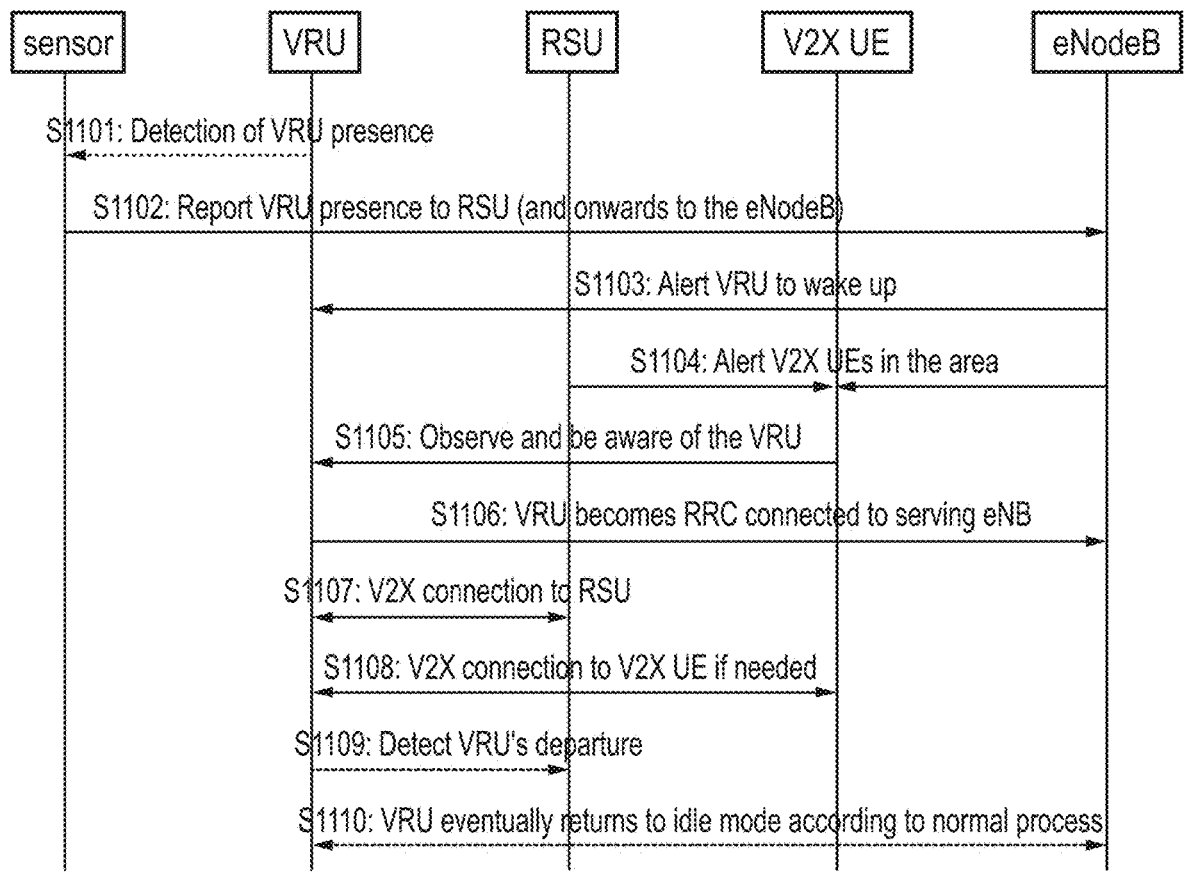
FIG. 11 illustrates an example call flow for activating a VRU.

FIG. 11 illustrates an example call flow for activating a VRU in accordance with the teachings discussed above. First, at S1101 the VRU notifies its presence and this is detected by a sensor. The sensor can then report the presence of a VRU to the RSU (S1102). In this example the RSU then forwards this notification to a base station however in other examples the RSU may not forward the notification to another element (for example in a case where the RSU is a eNB-based RSU such that it is also a base station). Then the base station having received the notification of the presence of the VRU can instruct at S1103 the VRU to connect to the base station using a message sent to a group of devices including the VRU (as the base station is at this stage still not aware of the identity of the VRU UE). This can be implemented using for example a paging or paging-like message or using any other suitable techniques in accordance with the present disclosure. Before, after or at the same as S1103, the RSU and/or base station can notify (S1104) any V2X device in the area that is already known and active to the RSU and/or base station of the presence of a VRU in the area. In some examples, based on the position of the sensor and on localisation information for the active V2X devices in the area (and optionally on the type of V2X device), the notification of the presence of the VRU can be transmitted to all of the vehicular-capable devices in the range of the RSU and/or base station's cell or to a selection of these vehicular-capable devices. Accordingly, the notified V2X UE(s) can then start being attentive to the potential presence of a VRU (S1105). In parallel, before or after the notification of the V2X devices, the VRU instructed at S1103 can connect to the base station, for example to transition into the RRC_connected state (S1106), and/or connect to the RSU (S1107). As the skilled person will recognised, in view of the previous discussion on the type of RSU, it will be understood that whether the terminal carried one or the other or both of S1106 and S1107 may depend on the type of RSU and/or on the implementations for V2X services and communications. If for examples in some environments the VRU UE may be able to engage in V2X communications without being connected to the base station, the UE may only connect to the RSU and may not connect to the base station. In other cases, if the terminal is expected to always connect to a conventional base station (e.g. even in cases where the RSU is an eNB-based RSU), then the terminal will carry out both S1106 and S1107. Then the VRU UE can engage in V2X communications (S1108) if appropriate, for example to receive warnings regarding a possible risk associated with the presence of another V2X device in the area. Optionally, once the RSU is no longer within range of the RSU (S1109)—which can be detected by either or both the VRU and the RSU—the VRU can return into idle mode at S1110. In other examples, this can be carried out, if appropriate at any other suitable time, for example once the VRU UE leaves coverage of the base station.

In other implementations, rather than using paging or paging-like mechanisms as discussed above, the activation of the VRU UE may be carried out using system information. In mobile networks, the network regularly or periodically transmits system information to all of the terminals and this information is read by all terminals including the connected and the idle terminals. Accordingly, this broadcasted system information may be used for activating VRUs.

In current implementations, the mobile network transmits System Information Blocks (SIBs) repeatedly, on intervals that can be set on a network-by-network basis. In accordance with the present disclosure, a SIB may be transmitted for V2X related information, for example via the introduction of a new SIB for VRU activation. This technique can reduce the amount of changes to the network by adding a new SIB for vehicular-related services for example as new SIB 10-12 and 13 have been introduced recently. Accordingly, all the UEs reading the paging message (for transmitting this system information) would read the system information blocks whether they are in connected mode or idle mode and UEs in idle mode could thus be reached in this manner. Additionally, using a dedicated SIB for V2X services and/or for VRU activation, location information regarding the RSU that requests VRU activation can be included in the SIB (e.g. by appending it to the payload) and only the V2X enabled UEs that are in the proximity of the RSU (e.g. that can detect the RSU) may then be activated. This could further reduce the number of devices to become active from potentially all V2X or VRU devices in the cell to all V2X or VRU devices close to the relevant RSU. Accordingly, only this limited number of V2X devices would be activated and connect to the base station while the others could remain in idle mode.

As for the examples discussed above using a paging message, once activated the terminal may not always establish an end-to-end bearer with the core network. In some example, this can even be configurable by the network dynamically and on a case-by-case basis. For example, when a new system information field is added to the SIBs that the network broadcasts periodically, a pre-defined parameter may be used to indicate whether the V2X or VRU UE activated would establish an end-to-end connection when activated or whether it could remain connected to the base station only (e.g. RRC connected mode only with the serving eNodeB that will set up the V2X connection via the PC5 or Uu interface).

While documents can be found (e.g. US 20150002311 [4]; DE 102012211172 [5]; or US 20110090093 [6]) that discuss detection of V2X devices, they fail to address the problem of being able to reach, if possible efficiently, a VRU device when its presence is known but its identity is not known such that it cannot be contacted directly. Reference [4] discusses a remote locking system where, in addition to responding to the car user's key fob, the system also detects beacons from pedestrians with "key fobs" of their own. However this particular application can only consider the received signal strength in considering the proximity of the VRU to the vehicle, such that the estimated position of the VRU could be anywhere within a circle of a certain radius and, as a result this is subject to cause many false alarms where the VRU is in no relation of danger with respect to the vehicle receiving the beacon signal. On the other, there is no network control over the notifications and the network is still entirely unaware of the presence, let alone of the identity, of the VRU. Reference [5] discusses an arrangement where a wearable device may receive notification and warning however, this arrangement relies on the device being in connected mode and should the device be in idle mode, then it could not be contacted or warning by the V2X systems. Finally, reference [6] where a terminal regularly updates the network about its location. Again, this would result in a high power consumption for the terminal as the terminal would have to regularly—if not always—be connected to the network to send location updates (or the last known position will be inaccurate) and this does not address the problem of a terminal that is likely to be in idle mode most of the time.

Figure 12:
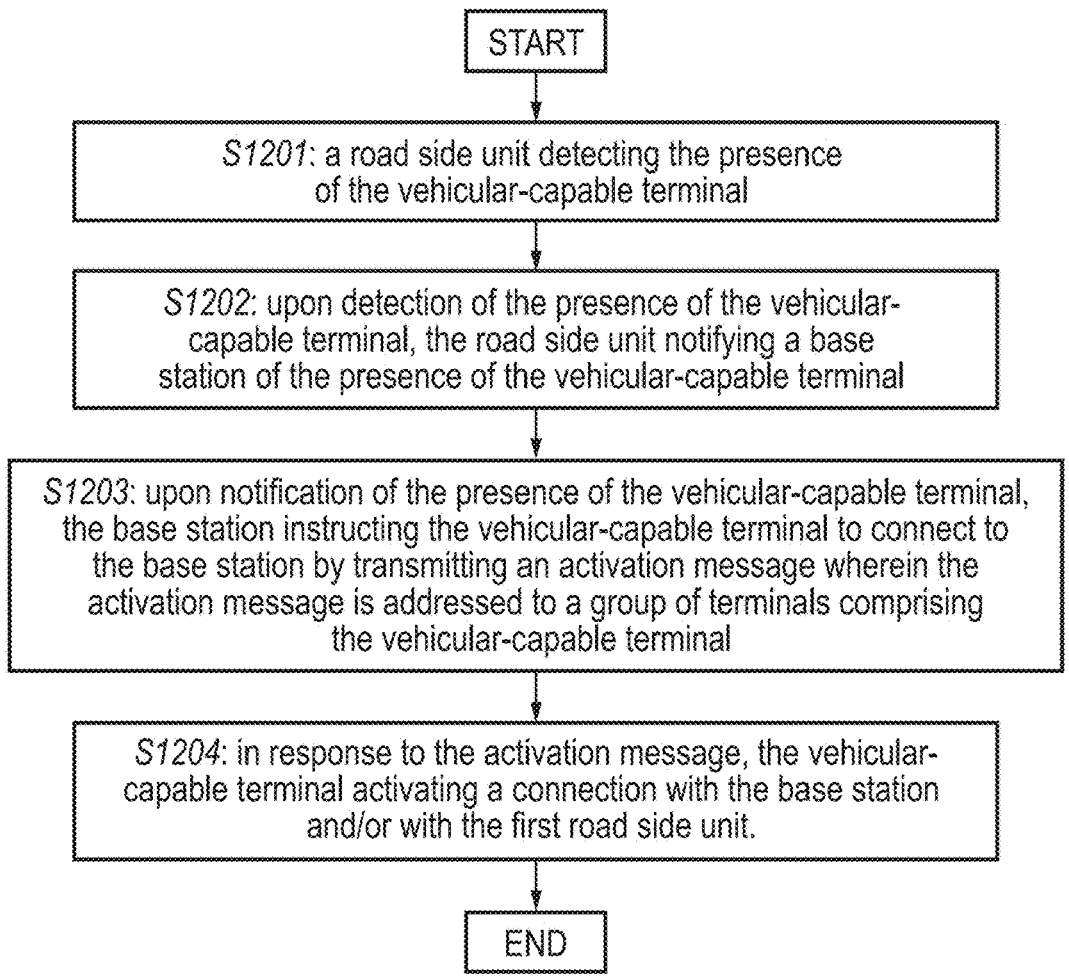
FIG. 12 represents an example method of activating a vehicular-capable terminal in a mobile telecommunications network.

FIG. 12 represents an example method of activating a vehicular-capable terminal in a mobile telecommunications network in accordance with the present disclosure. The method starts and at S1201, a road side unit detects the presence of the vehicular-capable terminal. The RSU may detect the vehicular capable terminal using one or more sensors and when at least one of the one or more sensors notifies the RSU that the terminal has been detected, the RSU can thereby detect the terminal. Then at S1202, upon detection of the presence of the vehicular-capable terminal, the road side unit notifies a base station of the presence of the vehicular-capable terminal. In the case that the RSU is a base station-based RSU, then step S1202 is automatically carried out as part of S1201.

Then at S1203, upon notification of the presence of the vehicular-capable terminal, the base station instructs the vehicular-capable terminal to connect to the base station by transmitting an activation message. The activation message is addressed to a group of terminals comprising the vehicular-capable terminal. In response to the activation message, the vehicular-capable terminal activates a connection with the first base station and/or with the first road side unit (S1204). In some examples the connection with the base station can be a Radio Resources Control (RRC) connection.

Accordingly, the vehicular-capable device can be activated once its presence is detected near a RSU. While this may involve activating other terminals at the same time (e.g. other terminals in the group of terminals addressed by the activation message), this still enables at least the relevant device to become connected to the base station and/or RSU so that it can engage in V2X communications. In some examples (e.g. where the network allows it and/or where the terminal is configured to activate in this manner), the terminal connects to the RSU only so that it can engage in V2X communications with this RSU but does not connect to the base station upon reception of the activation message. In other examples the terminal may connect to both the RSU and base station, in parallel or one after the other (e.g. to the base station first and then to the RSU).

As discussed above, the activation message may be a paging message which can be addressed to all terminals in a tracking area comprising the base station, to all terminals within range of the base station, to all vehicular-capable terminals within range of the base station or in the tracking area or to all VRU terminals within range of the base station or in the tracking area. In some examples, the paging message is addressed to all vehicular-capable terminals within range of the base station using at least one of: a mobile subscriber identifier allocated for paging vehicular-capable terminals or to terminals associated with vulnerable road users; and a network temporary identifier allocated for paging vehicular-capable terminals or to terminals associated with vulnerable road users. Accordingly the number of terminals that will potentially receive the activation message and become connected can be reduced for a more targeted device activation.

In some examples, the activation message may be comprised in a system information message transmitted by the base station.

In some examples, the base station may transmit the activation message upon identification that the presence of the vehicular-capable terminal in the area of the road side unit is associated with a safety risk for the vehicular-capable terminal. For example, if the base station is not aware of any other V2X terminal in the area, it may not be necessary to activate the terminal and the terminal can remain in idle mode (in a non-connected mode) even if its presence has been detected in an area that could be dangerous in different circumstances. Viewed from a different perspective, the base station can carry out a risk assessment before determining whether to transmit the activation message to activate the terminal or not. This can for example involve estimating the safety risk for the vehicular-capable terminal based on presence information for one or more terminals other than the vehicular-capable terminal in the vicinity of the road side unit.

Once the terminal is connected (S1204), the terminal may start exchanging vehicular related data with the road side unit, if appropriate.

As previously discussed, the terminal—when activating a connection with the base station—may activate a connection with the base station but not with an element in a core network portion of the mobile telecommunications network. For example, it may not activate a connection with an anchor element of the core network, the anchor element being for example a MME. For example, upon activation of the connection with the base station, the vehicular-capable terminal may exchange vehicular related data with the road side unit while the terminal is still not connected to an element in a core network portion of the mobile telecommunications network.

Ad the skilled person will understand, the vehicular-capable terminal may be a vulnerable road user (VRU) terminal although the teachings discussed in the present disclosure (in respect of the first and second examples) can be equally applied to vehicular-capable devices regardless of their VRU status.

Also, as previously mentioned, the base station may in some examples be configured to operate as a road side unit and, in this case the base station and the road side unit can be the same element. It is in particular noteworthy that this second example is applicable to both eNB-based RSUs and non-eNB-based eNB (e.g. UE-based eNB).

Figure 13:
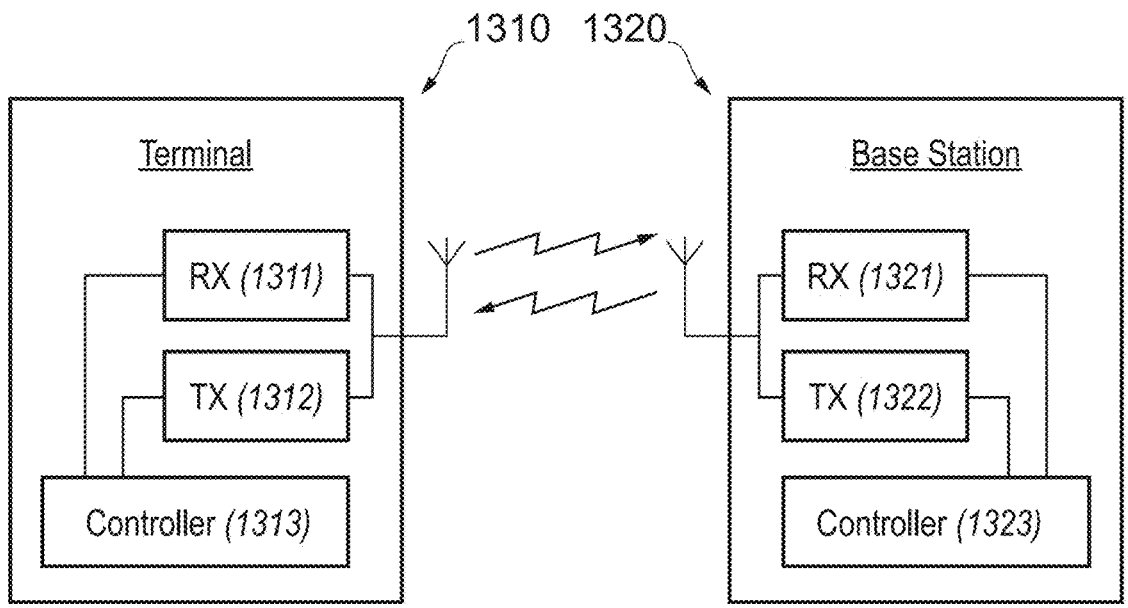
FIG. 13 illustrates an example terminal and an example base station.

FIG. 13 illustrates an example terminal (1310) and an example base station (1320) configured to communicate with each other and which may implement one or more techniques as discussed herein. The terminal 1310 comprises a receiver 1311 and a transmitter 1312 connected to an antenna for communicating via a wireless interface. The terminal also comprises a controller 1313 for controlling at least the receiver and transmitter of the terminal 1310. In some example, the terminal may be configured such that the controller, receiver and transmitter may be configured to operate together to operate as a D2D relay node to assist communication from other terminals. Likewise, the base station 1320 comprises a receiver 1321 and a transmitter 1322 connected to an antenna for communicating via a wireless interface. The base station 1320 also comprises a controller 1323 for controlling at least the receiver and transmitter of the base station 1320. The base station and terminal can communicate over the air, via the wireless interface by transmitting uplink signals from the terminal to the base station and downlink signals from the base station to the terminal. D2D Terminals can also communicate with each other directly using sidelink signals. A road side unit in accordance with the present disclosure may also have the same structure as the terminal and/or base station.

While FIG. 13 shows a schematic illustration of a terminal and of a base station, it will be appreciated that while in examples of the present disclosure, each terminal includes a transmitter, receiver and controller and each base station includes a transmitter, receiver and controller so as to allow communication between the terminals and/or base stations, the terminal and base station may be implemented using any appropriate technique. For example, the controller may comprise one or more processor units which are suitably configured/programmed to provide the desired functionality described herein using conventional programming/configuration techniques for equipment in wireless telecommunications systems. For each terminal, the transmitter, receiver and controller are schematically shown in FIG. 13 as separate elements for ease of representation. However, it will be appreciated that for each terminal the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminals will in general comprise various other elements associated with their operating functionality in accordance with established wireless telecommunications techniques (e.g. a power source, possibly a user interface, and so forth).

In the examples given in the present disclosure the terminals have been in many cases described as V2X terminals in the interest of conciseness. However, as the skilled person will recognise, the teachings of the present disclosure are applicable for any V2X-enabled terminals, that is, for any terminals that have vehicle- or transportation-related functionalities activated. These can be referred to as V2X, vehicular-capable, V2X-compatible V2X enabled terminals and so forth. In some examples the teachings of the present disclosure may be applied to all V2X terminals and in other examples they may be applied to VRU V2X terminals only, if appropriate. Also, when reference is made to a V2X-enabled terminal, it is to be understood as a terminal with V2X capabilities and, optionally, as a V2X terminal with activated V2X-functionalities. In some examples, a terminal which is configured to be used in a V2X environment but which is not currently used in that environment may not be considered as a V2X-enabled terminal in some of the examples above. For example the terminal may be configured to be used in association with a vehicle but may be currently used outside the vehicle as a conventional telephone such that it will not operate as V2X terminal at this point in time and it is thus unlikely to transmit or respond to V2X messages when the V2X-functionalities are not enabled on the terminal.

Additionally, the method steps discussed herein may be carried out in any suitable order. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously or in the same order. For example, in the call flow of FIG. 11, S1104/S1105 and S1106/S1107 may be carried out in any suitable order, such as one after the other (S1104/S1105 then S1106/S1107 or and S1106/S1107 then S1104/S1105) or at least partially in parallel. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example transmitting a message may involve using several resource elements in an LTE environment such that several signals at a lower layer correspond to a single message at a higher layer. Also, transmissions from one terminal to another may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more of a mobile terminal (e.g. a D2D terminal), a RSU (e.g. a terminal-to-terminal relay node), a base station or any other mobile node may be configured accordingly if appropriate, so long as it is technically feasible and not explicitly excluded.

Whenever the expressions "greater than" or "smaller than" or equivalent are used herein, it is intended that they discloses both alternatives "and equal to" and "and not equal to" unless one alternative is expressly excluded.

It is noteworthy that even though the present disclosure has been discussed in the context of LTE and/or D2D, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard (e.g. the 5G standards).

According to the present disclosure, there are provided methods and apparatuses for activating a vehicular-capable terminal to connect to a base station and/or road side unit. Accordingly a vehicular-capable terminal which would otherwise be in idle mode can then participate in vehicular communications, if appropriate.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered clauses:

Clause 1. A method of activating a vehicular-capable terminal in a mobile telecommunications system, the mobile telecommunications system comprising a plurality of base stations operable to communicate with the vehicular-capable terminal and wherein at least one base station of the plurality of base stations is configured to operate as a road side unit and wherein the method comprises:

the vehicular-capable terminal receiving a list of one or more base stations selected from the plurality of base stations;

upon detection that the vehicular-capable terminal is within range of a first base station, the vehicular-capable terminal determining whether to activate, based on the list of base stations, a connection with the first base station; and upon determining to activate a connection with the first base station, the vehicular-capable terminal activating the connection with the first base station.

Clause 2. The method of clause 1 wherein determining whether to activate a connection with the first base station comprises identifying that the first base station is not on the list of one or more base stations.

Clause 3. The method of clause 1 wherein determining whether to activate a connection with the first base station comprises identifying that the first base station is on the list of one or more base stations, wherein the one or more base stations are further selected from the at least one base station.

Clause 4. The method of any preceding clause wherein, upon activation of the connection with the first base station, the vehicular-capable terminal exchanging vehicular related data with the first base station.

Clause 5. The method of any preceding clause wherein the vehicular-capable terminal is a vulnerable road user (VRU) terminal.

Clause 6. The method of any preceding clause wherein:
the vehicular-capable terminal activating a connection with the base station comprises the vehicular-capable terminal not activating a connection with a core network portion of the mobile telecommunications system.

Clause 7. The method of clause 4 further comprising, upon activation of the connection with the first base station, the vehicular-capable terminal exchanging vehicular related data with the first base station while the terminal is not connected to the core network portion of the mobile telecommunications system.

Clause 8. The method of any preceding clause comprising the terminal, upon activation of the connection with the base station, not activating a connection with an anchor element of a core network portion of the mobile telecommunications system wherein, optionally, the anchor element is a mobility manager entity (MME).

Clause 9. The method of any preceding clause wherein, upon detection that the vehicular-capable terminal is no longer within range of the first base station, the vehicular-capable terminal de-activating the connection to the first base station and the vehicular-capable terminal switching to an idle connection mode wherein, optionally, the idle connection mode is an idle Radio Resources Control (RRC) mode.

Clause 10. The method of any preceding clause wherein the vehicular-capable terminal activating a connection with the first base station comprises the vehicular-capable terminal switching to a connected mode wherein, optionally, the connected mode is a connected Radio Resources Control (RRC) mode.

Clause 11. The method according to any preceding clause wherein the method further comprises the vehicle receiving the list of road side units from one of the plurality of base stations.

Clause 12. The method of any preceding clause wherein, upon activating the connection with the first base station, the first base station transmitting an updated list of one or more base stations.

Clause 13. The method of any preceding clause wherein the list of base stations is comprised in a tracking area list communicated by the mobile telecommunications system to the vehicular-capable terminal.

Clause 14. A mobile telecommunications system for activating a vehicular-capable terminal, the mobile telecommunications system comprising:
a vehicular-capable terminal, and
a plurality of base stations operable to communicate with the vehicular-capable terminal and wherein at least one base station of the plurality of base stations is configured to operate as a road side unit wherein the vehicular-capable terminal is configured to receive a list of one or more base stations selected from the plurality of base stations;

the vehicular-capable terminal is configured, upon detection that the vehicular-capable terminal is within range of a first base station, to determine based on the list of base stations whether to activate a connection with the first base station; and the vehicular-capable terminal is configured, upon determining to activate a connection with the first base station, to activate the connection with the first base station.

15. A mobile telecommunications system for activating a vehicular-capable terminal, the mobile telecommunications system comprising:

a vehicular-capable terminal, and a plurality of base stations operable to communicate with the vehicular-capable terminal and wherein at least one base station of the plurality of base stations is configured to operate as a road side unit wherein the vehicular-capable terminal and the plurality of base stations are configured to carry out together the method of any of clauses 1 to 13.

Clause 16. A vehicular-capable terminal for use in a mobile telecommunications system, the mobile telecommunications system comprising a plurality of base stations operable to communicate with the vehicular-capable terminal and wherein at least one base station of the plurality of base stations is configured to operate as a road side unit, the vehicular-capable terminal comprising a transmitter, a receiver and a controller, wherein the controller is configured to:

receive, via the receiver, a list of one or more base stations selected from the plurality of base stations;

upon detection that the vehicular-capable terminal is within range of a first base station, determine based on the list of base stations whether to activate a connection with the first base station; and upon determining to activate a connection with the first base station, activate the connection with the first base station.

Clause 17. A vehicular-capable terminal for use in a mobile telecommunications system, the vehicular-capable terminal comprising a transmitter, a receiver and a controller, wherein the transmitter, receiver and controller together are configured to operate as the vehicular-capable terminal of the mobile telecommunications system of clause 14 or 15.

Clause 18. Circuitry for a vehicular-capable terminal for use in a mobile telecommunications system, the mobile telecommunications system comprising a plurality of base stations operable to communicate with the vehicular-capable terminal and wherein at least one base station of the plurality of base stations is configured to operate as a road side unit, wherein the circuitry comprises a controller element and a transceiver element configured to operate together to:

receive a list of one or more base stations selected from the plurality of base stations;

upon detection that the vehicular-capable terminal is within range of a first base station, determine based on the list of base stations whether to activate a connection with the first base station; and upon determining to activate a connection with the first base station, activate the connection with the first base station.

Clause 19. A base station for use in a mobile telecommunications system, the mobile telecommunications system comprising a plurality of base stations operable to communicate with the vehicular-capable terminal and a vehicular-capable terminal, wherein the base station is one of the plurality of base stations and is configured to operate as a road side unit, the base station comprising a transmitter, a receiver and a controller, wherein the controller is configured to:

transmit, via the transmitter, a list of one or more base stations selected from the plurality of base stations to the vehicular-capable terminal, wherein the list is for use by the vehicular-capable terminal to determine based on the list of base stations whether to activate a connection with a first base station of the plurality of base stations, upon detection that the vehicular-capable terminal is within range of a first base station.

Clause 20. Circuitry for a base station for use in a mobile telecommunications system, the mobile telecommunications system comprising a plurality of base stations operable to communicate with the vehicular-capable terminal and a vehicular-capable terminal wherein the base station is one of the plurality of base stations and wherein the circuitry comprises a controller element and a transceiver element configured to operate together to:

transmit, via the transmitter, a list of one or more base stations selected from the plurality of base stations to the vehicular-capable terminal, wherein the list is for use by the vehicular-capable terminal to determine based on the list of base stations whether to activate a connection with a first base station of the plurality of base stations, upon detection that the vehicular-capable terminal is within range of a first base station.

Clause 21. A method of activating a vehicular-capable terminal in a mobile telecommunications system, the mobile telecommunications system comprising one or more base stations operable to communicate with the vehicular-capable terminal and one or more road side units operable to communicate with the vehicular-capable terminal, wherein the method comprises:

a first road side unit detecting the presence of the vehicular-capable terminal;

upon detection of the presence of the vehicular-capable terminal, the first road side unit notifying a first base station of the presence of the vehicular-capable terminal;

upon notification of the presence of the vehicular-capable terminal, the first base station instructing the vehicular-capable terminal to connect to the first base station by transmitting an activation message wherein the activation message is addressed to a group of terminals comprising the vehicular-capable terminal; and in response to the activation message, the vehicular-capable terminal activating a connection with the first base station and/or with the first road side unit.

Clause 22. The method of clause 11 wherein the activation message is a paging message.

Clause 23. The method of clause 12 wherein the paging message is addressed to all terminals within range of the first base station and/or all vehicular-capable terminals within range of the first base station.

Clause 24. The method of clause 12 or 13 wherein the paging message is addressed all vehicular-capable terminals within range of the first base station using at least one of:

a mobile subscriber identifier allocated for paging vehicular-capable terminals or to terminals associated with vulnerable road users; and a network temporary identifier allocated for paging vehicular-capable terminals or to terminals associated with vulnerable road users.

Clause 25. The method of clause 11 wherein the activation message is comprised in a system information message transmitted by the first base station.

Clause 26. The method of one of clauses 11 to 15 further comprising, the first base station transmitting the activation message upon detection that the presence of the vehicular-capable terminal in the area of the first road side unit is associated with a safety risk for the vehicular-capable terminal.

Clause 27. The method of clause 16 further comprising estimating the safety risk for the vehicular-capable terminal based on presence information for one or more terminal other than the vehicular-capable terminal in the vicinity of the first road side unit.

Clause 28. The method of one of clauses 11 to 17 further comprising, upon activation of the connection with the first base station, the vehicular-capable terminal exchanging vehicular related data with the first road side unit.

Clause 29. The method of one of clauses 11 to 18, wherein activating a connection with the first base station comprises activating a connection with the first base station and not with an element in a core network portion of the mobile telecommunications system.

Clause 30. The method of clause 19 further comprising, upon activation of the connection with the first base station, the vehicular-capable terminal exchanging vehicular related data with the first road side unit while the terminal is not connected to an element in a core network portion of the mobile telecommunications system Clause 31. The method of one of clauses 21 to 30 wherein notifying a first base station of the presence of the vehicular-capable terminal comprises the first road side unit sending a notification message to the first base station, wherein the notification message does not include an individual identifier for the vehicular-capable terminal.

Clause 32. The method of one of clauses 21 to 31 wherein the vehicular-capable terminal is a vulnerable road user (VRU) terminal.

Clause 33. The method of any of clauses 11 to 21 wherein the first base station is configured to operate as a road side unit and wherein the first base station is the first road side unit.

Clause 34. The method of one of clauses 21 to 33 wherein the connection with the first base station is a Radio Resources Control (RRC) connection.

Clause 35. A mobile telecommunications system, the mobile telecommunications system comprising:
a vehicular-capable terminal,
one or more base stations operable to communicate with the vehicular-capable terminal, and
one or more road side units operable to communicate with the vehicular-capable terminal,
wherein:
a first road side unit of the one or more road side units is configured to detect the presence of the vehicular-capable terminal;
the first road side unit is configured to, upon detection of the presence of the vehicular-capable terminal, notify a first base station of the one or more base stations of the presence of the vehicular-capable terminal;
the first base station is configured to, upon notification of the presence of the vehicular-capable terminal, instruct the vehicular-capable terminal to connect to the first base station by transmitting an activation message wherein the activation message is addressed to a group of terminals comprising the vehicular-capable terminal; and
the vehicular-capable terminal is configured to, in response to the activation message, activate a connection with the first base station and/or with the first road side unit.

Clause 36. A mobile telecommunications system, the mobile telecommunications system comprising:
a vehicular-capable terminal,
one or more base stations operable to communicate with the vehicular-capable terminal, and
one or more road side units operable to communicate with the vehicular-capable terminal,
wherein the vehicular-capable terminal, the one or more base stations and the one or more road side units are configured to carry out together the method of any of clauses 21 to 34.

Clause 37. A vehicular-capable terminal for use in a mobile telecommunications system, the mobile telecommunications system comprising one or more base stations operable to communicate with the vehicular-capable terminal and one or more road side units operable to communicate with the vehicular-capable terminal, the vehicular-capable terminal comprising a transmitter, a receiver and a controller, wherein the controller is configured to:
advertise the presence of the vehicular-capable terminal to a first road side unit of the one or more road side units;
receive, via the receiver, an activation message from a first base station of the one or more base stations wherein the activation message is addressed to a group of terminals comprising the vehicular-capable terminal and is for instruct the vehicular-capable terminal to connect to the first base station; and
responsive to the activation message, activate a connection with the first base station and/or with the first road side unit.

Clause 38. A vehicular-capable terminal for use in a mobile telecommunications system, the vehicular-capable terminal comprising a transmitter, a receiver and a controller, wherein the transmitter, receiver and controller together are configured to operate as the vehicular-capable terminal of the mobile telecommunications system of clause 35 or 36.

Clause 39. Circuitry for a vehicular-capable terminal for use in a mobile telecommunications system, the mobile telecommunications system comprising one or more base stations operable to communicate with the vehicular-capable terminal and one or more road side units operable to communicate with the vehicular-capable terminal, wherein the circuitry comprises a controller element and a transceiver element configured to operate together to:
advertise the presence of the vehicular-capable terminal to a first road side unit of the one or more road side units;
receive, via the receiver, an activation message from a first base station of the one or more base stations wherein the activation message is addressed to a group of terminals comprising the vehicular-capable terminal and is for instruct the vehicular-capable terminal to connect to the first base station; and
responsive to the activation message, activate a connection with the first base station and/or with the first road side unit.

Clause 40. A base station for use in a mobile telecommunications system, the mobile telecommunications system comprising one or more base stations operable to communicate with the vehicular-capable terminal and one or more road side units operable to communicate with the vehicular-capable terminal, wherein the base station is one of the one or more of base stations, the base station comprising a transmitter, a receiver and a controller, wherein the controller is configured to:
receive a notification from a first road side unit of the one or more road side units, wherein the notification is for reporting a presence of the vehicular-capable terminal detected by the first road side unit; and upon notification of the presence of the vehicular-capable terminal, instruct the vehicular-capable terminal to connect to the first base station by transmitting an activation message wherein the activation message is addressed to a group of terminals comprising the vehicular-capable terminal.

Clause 41. A base station for use in a mobile telecommunications system, the base station comprising a transmitter, a receiver and a controller wherein the transmitter, receiver and controller together are configured to operate as the first base station of the mobile telecommunications system of clause 35 or 36

Clause 42. Circuitry for a base station for use in a mobile telecommunications system, the mobile telecommunications system comprising one or more base stations operable to communicate with the vehicular-capable terminal and one or more road side units operable to communicate with the vehicular-capable terminal wherein the base station is one of the one or more of base stations and wherein the circuitry comprises a controller element and a transceiver element configured to operate together to:

receive a notification from a first road side unit of the one or more road side units, wherein the notification is for reporting a presence of the vehicular-capable terminal detected by the first road side unit; and upon notification of the presence of the vehicular-capable terminal, instruct the vehicular-capable terminal to connect to the first base station by transmitting an activation message wherein the activation message is addressed to a group of terminals comprising the vehicular-capable terminal.

Clause 43. A road side unit for use in a mobile telecommunications system, the mobile telecommunications system comprising a vehicular-capable terminal, one or more base stations operable to communicate with the vehicular-capable terminal and one or more road side units operable to communicate with the vehicular-capable terminal, wherein the road side unit is one of the one or more road side units and comprises a transmitter, a receiver and a controller, wherein the controller is configured to:

detect the presence of the vehicular-capable terminal; and upon detection of the presence of the vehicular-capable terminal, notify a first base station of the one or more base stations of the presence of the vehicular-capable terminal for the first base station to instruct the vehicular-capable terminal to connect to the first base station by transmitting an activation message, the activation message being addressed to a group of terminals comprising the vehicular-capable terminal.

Clause 44. A road side unit for use in a mobile telecommunications system, the road side unit comprising a transmitter, a receiver and a controller, wherein the transmitter, receiver and controller together are configured to operate as the first road side unit of the mobile telecommunications system of clause 35 or 36.

Clause 45. Circuitry for a road side unit for use in a mobile telecommunications system, the mobile telecommunications system comprising a vehicular-capable terminal, one or more base stations operable to communicate with the vehicular-capable terminal and one or more road side units operable to communicate with the vehicular-capable terminal, the road side unit being one of the one or more road side units, wherein the circuitry comprises a controller element and a transceiver element configured to operate together to:

detect the presence of the vehicular-capable terminal; and upon detection of the presence of the vehicular-capable terminal, notify a first base station of the one or more base stations of the presence of the vehicular-capable terminal for the first base station to instruct the vehicular-capable terminal to connect to the first base station by transmitting an activation message, the activation message being addressed to a group of terminals comprising the vehicular-capable terminal.

Clause 46. Computer software which, when executed by a computer, causes the computer to perform the method of any one of clauses 1 to 13 and 21 to 34.

Clause 47. A storage medium which stores computer software according to clause 46.

Clause 48. A method of activating a vehicular-capable terminal, a mobile telecommunications system, a vehicular-capable terminal, circuitry for a vehicular-capable terminal, a base station, circuitry for a base station, a method of activating a vehicular-capable terminal, a road side unit, circuitry for a road side unit, computer software and a storage medium substantially as hereinbefore described with reference to the accompanying drawings.

Clause 49. Any preceding clause wherein the terminal, the road side unit, the base station and the mobile telecommunications system are operable to communicate at least one of: a 3GPP communication protocol, an LTE communication protocol, a 4G communication protocol and a 5G communication protocol

REFERENCES

[1] Holma H. and Toskala A., "LTE for UMTS OFDMA and SC-FDMA based radio access", John Wiley and Sons, 2009
[2] 3GPP TS 23.003, "Technical Specification Group Core Network and Terminals; Numbering, addressing and identification", Release 13, v 13.3.0, September 2015
[3] U.S. Pat. No. 8,537,751 B2, "Minimizing tracking area updates in heterogeneous radio access network", 2013 Sep. 17
[4] US 20150002311 A1, "Active beacon for vulnerable road users", 2015 Jan. 1
[5] DE 102012211172 A1, "Method for protecting vulnerable road user from possible collision with vehicle, involves receiving or generating hint to possible collision of vulnerable road user with vehicle and sending command to device", 2014 Apr. 3
[6] US 2011090093 A1, "Vehicle to Entity Communication", 2011 Apr. 21

The invention claimed is:

1. Circuitry for a vehicular-capable terminal for use in a mobile telecommunications system, wherein the circuitry comprises a controller element and a transceiver element configured to operate together to:

receive a list of two or more base stations,
wherein the list includes:
a first list of one or more base stations that the vehicular-capable terminal is authorized to connect, and
a second list of one or more base stations that the vehicular-capable terminal is not authorized to connect;
while the vehicular-capable terminal is in an idle mode, receive a notification that the vehicular-capable terminal has been detected within range of a first base station,
based on the notification, determine based on the first list and the second list whether to activate a connection with the first base station; and upon determining to activate a connection with the first base station, exit the idle mode and activate the connection with the first base station, wherein, upon exiting the idle mode and activating the connection with the first base station, the circuitry is configured not to activate a connection with a core network portion of the mobile telecommunications system that controls the first base station.

2. The circuitry of claim 1, wherein determining whether to activate a connection with the first base station comprises identifying that the first base station is not on the second list.

3. The circuitry of claim 1, wherein
the circuitry is configured to activate the connection with the first base station only upon confirming that the first base station is on the first list and is not on the second list.

4. The circuitry of claim 1, wherein, upon activation of the connection with the first base station, the circuitry is configured to exchange vehicular related data with the first base station.

5. The circuitry of claim 1, wherein the vehicular-capable terminal is a vulnerable road user (VRU) terminal.

6. The circuitry of claim 1, wherein, upon activation of the connection with the first base station, the circuitry is configured to exchange vehicular related data with the first base station while the vehicular-capable terminal is not connected to the core network portion of the mobile telecommunications system that controls the first base station.

7. The circuitry of claim 1, wherein
upon activation of the connection with the base station, the vehicular-capable terminal is configured not to activate a connection with an anchor element of a core network portion of the mobile telecommunications system that controls the first base station, and
the anchor element is a mobility manager entity (MME).

8. The circuitry of claim 1, wherein,
upon detection that the vehicular-capable terminal is no longer within range of the first base station, the circuitry is configured to:
de-activate the connection to the first base station, and
switch the vehicular-capable terminal back to the idle mode, and
the idle mode is an idle Radio Resources Control (RRC) mode.

9. The circuitry of claim 1, wherein the circuitry is configured to activate the connection with the first base station by switching from the idle mode to a connected mode, the idle mode being an idle Radio Resources Control (RRC) mode, and the connected mode being a connected RRC mode.

10. The circuitry of claim 1, wherein, upon activating the connection with the first base station, the circuitry is configured to receive a list of road side units from the mobile telecommunications system.

11. The circuitry of claim 1, wherein, upon activating the connection with the first base station, the first base station is configured to transmit an update to the list.

12. The circuitry of claim 1, wherein
upon activation of the connection with the base station, the circuitry is configured to activate a connection with an anchor element of a core network portion of the mobile telecommunications system, and
the anchor element is a mobility manager entity (MME).

13. The circuitry of claim 1, wherein the list of two or more base stations is comprised in a tracking area list communicated by the mobile telecommunications system to the vehicular-capable terminal.

14. The circuitry of claim 1, wherein
the circuitry is configured to notify, while in the idle mode, a presence of the vehicular-capable terminal to a road side unit associated with the first base station,
in response to being notified of the presence of the vehicular-capable terminal, the road side unit is configured to report the presence of the vehicular-capable terminal to a master base station via the first base station, and
in response to the reported presence of the vehicular-capable terminal, the master base station is configured to alert the vehicular-capable terminal to wake up from the idle mode and determine whether to activate the connection with the first base station.

15. The circuitry of claim 1, wherein the circuitry is configured to determine whether the vehicular-capable terminal is within the range of the first base station.

16. A method performed by circuitry of a vehicular-capable terminal for use in a mobile telecommunications system, wherein the circuitry comprises a controller element and a transceiver element, the method comprising:
receiving a list of two or more base stations,
wherein the list includes:
a first list of one or more base stations that the vehicular-capable terminal is authorized to connect, and
a second list of one or more base stations that the vehicular-capable terminal is not authorized to connect;
while the vehicular-capable terminal is in an idle mode, receiving a notification that the vehicular-capable terminal has been detected within range of a first base station,
based on the notification, determining based on the first list and the second list whether to activate a connection with the first base station; and
upon determining to activate a connection with the first base station, exiting the idle mode and activating the connection with the first base station, wherein
the method further comprises, upon exiting the idle mode and activating the connection with the first base station, not activating a connection with a core network portion of the mobile telecommunications system that controls the first base station.

17. The method of claim 16, wherein, upon activation of the connection with the first base station, the method further comprises exchanging vehicular related data with the first base station while the vehicular-capable terminal is not connected to the core network portion of the mobile telecommunications system that controls the first base station.

* * * * *